United States Patent
Row, II

(10) Patent No.: US 9,912,640 B2
(45) Date of Patent: *Mar. 6, 2018

(54) SECURE NETWORK ENROLLMENT

(71) Applicant: Oceus Networks Inc., Reston, VA (US)

(72) Inventor: James Thomas Row, II, Plano, TX (US)

(73) Assignee: Oceus Networks Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/616,190

(22) Filed: Jun. 7, 2017

(65) Prior Publication Data
US 2018/0013724 A1 Jan. 11, 2018

Related U.S. Application Data

(63) Continuation of application No. 15/204,793, filed on Jul. 7, 2016, now Pat. No. 9,686,238.

(51) Int. Cl.
*H04L 29/06* (2006.01)
*H04W 48/16* (2009.01)
(Continued)

(52) U.S. Cl.
CPC .......... *H04L 63/0272* (2013.01); *H04L 12/06* (2013.01); *H04L 63/0428* (2013.01);
(Continued)

(58) Field of Classification Search
CPC ... H04W 84/005; H04W 36/32; H04W 76/02; H04W 84/042; H04W 84/20;
(Continued)

(56) References Cited

U.S. PATENT DOCUMENTS 5,768,501 A 6/1998 Lewis
6,842,462 B1 1/2005 Ramjee et al.
(Continued)

FOREIGN PATENT DOCUMENTS

EP 1401229 A1 3/2004
EP 1553734 A1 7/2005
(Continued)

OTHER PUBLICATIONS

"Digital cellular telecommunications system (Phase 2+); Universal Mobile Telecommunications System (UMTS); L TE; Interworking between the Public Land Mobile Network (PLMN) supporting packet based services and Packet Data Networks (PDN)" Technical Specification, European Telecommunication Standards Institute (ETSI), France, vol. 36PP CT3, No. V11.4.0, Apr. 1, 2013.
(Continued)

*Primary Examiner* — Amir Mehrmanesh
(74) *Attorney, Agent, or Firm* — Knobbe, Martens, Olson & Bear, LLP

(57) ABSTRACT

A UE communicates with a network gateway to access a provisioning device via a provisioning network. The provisioning device uses identification data of the UE to authenticate the UE for a primary network, and provides primary network configuration data to the UE. Using the primary network configuration data, the UE communicates with the network gateway to access the primary network. The primary network configuration data can include data to enable the UE to establish communications with one or more private networks accessible via the primary network.

27 Claims, 9 Drawing Sheets

(51) Int. Cl.
*H04W 76/02* (2009.01)
*H04L 12/06* (2006.01)

(52) U.S. Cl.
CPC ...... *H04L 63/0876* (2013.01); *H04L 63/0884* (2013.01); *H04W 48/16* (2013.01); *H04W 76/02* (2013.01)

(58) Field of Classification Search
CPC ... H04L 43/12; H04L 41/046; H04L 41/0806; H04L 67/12; H04L 67/10
See application file for complete search history.

(56) References Cited

U.S. PATENT DOCUMENTS

| | | | |
|---|---|---|---|
| 6,965,816 B2 | 11/2005 | Walker | |
| 7,486,967 B2 | 2/2009 | Pan et al. | |
| 7,535,861 B2 | 5/2009 | Buchholz et al. | |
| 7,539,158 B2 | 5/2009 | Pan | |
| 7,548,763 B2 | 6/2009 | Pan | |
| 7,567,822 B2 | 7/2009 | Hart et al. | |
| 7,573,713 B2 | 8/2009 | Hoffman et al. | |
| 7,653,414 B2 | 1/2010 | Pan | |
| 7,684,801 B2 | 3/2010 | Suzuki et al. | |
| 7,805,372 B2 | 9/2010 | Weiss | |
| 7,817,589 B2 | 10/2010 | Hoffman et al. | |
| 7,840,230 B2 | 11/2010 | Pan | |
| 7,855,988 B2 | 12/2010 | Pan | |
| 7,856,233 B2 | 12/2010 | Pan | |
| 7,979,066 B2 | 7/2011 | Pan | |
| 8,036,158 B2 | 10/2011 | Pan et al. | |
| 8,046,420 B2 | 10/2011 | Pan | |
| 8,089,920 B2 | 1/2012 | Pan | |
| 8,107,409 B2 | 1/2012 | Pan | |
| 8,140,077 B2 | 3/2012 | Saifullah et al. | |
| 8,224,322 B2 | 7/2012 | Pan | |
| 8,270,325 B2 | 9/2012 | Hoffman et al. | |
| 8,310,990 B2 | 11/2012 | Pan | |
| 8,326,286 B2 | 12/2012 | Pan | |
| 8,340,667 B2 | 12/2012 | Pan | |
| 8,359,029 B2 | 1/2013 | Pan | |
| 8,374,124 B2 | 2/2013 | Abusch-Magder et al. | |
| 8,503,336 B2 | 8/2013 | Rappaport et al. | |
| 8,626,210 B2 | 1/2014 | Hicks, III | |
| 8,654,749 B2 | 2/2014 | Buchholz et al. | |
| 8,676,197 B2 | 3/2014 | Pan et al. | |
| 8,688,111 B2 | 4/2014 | Pan | |
| 8,706,105 B2 | 4/2014 | Pan | |
| 8,744,435 B2 | 6/2014 | Pan | |
| 8,780,804 B2 | 7/2014 | Pan | |
| 8,811,992 B2 | 8/2014 | Hoole | |
| 8,824,969 B2 | 9/2014 | Nakamori et al. | |
| 9,055,163 B1 | 6/2015 | Row, II et al. | |
| 9,167,442 B2 | 10/2015 | Uelk et al. | |
| 9,198,221 B2 | 11/2015 | Schemagin et al. | |
| 9,226,192 B2 | 12/2015 | Graffagnino et al. | |
| 9,264,241 B2 | 2/2016 | Balar et al. | |
| 9,444,801 B2 | 9/2016 | Luo et al. | |
| 9,445,280 B2 | 9/2016 | Uelk et al. | |
| 9,451,646 B2 | 9/2016 | Schemagin et al. | |
| 9,742,729 B2 | 8/2017 | Graffagnino et al. | |
| 2001/0013107 A1 | 8/2001 | Lewis | |
| 2004/0259555 A1 | 12/2004 | Rappaport et al. | |
| 2006/0015745 A1 | 1/2006 | Sukigara et al. | |
| 2006/0098661 A1 | 5/2006 | Pan | |
| 2006/0192651 A1 | 8/2006 | Lee | |
| 2006/0234747 A1 | 10/2006 | Pan et al. | |
| 2006/0234774 A1 | 10/2006 | Pan et al. | |
| 2007/0049267 A1 | 3/2007 | Kota et al. | |
| 2007/0202847 A1 | 8/2007 | Pan et al. | |
| 2007/0232267 A1 | 10/2007 | Pan et al. | |
| 2007/0253359 A1 | 11/2007 | Hall et al. | |
| 2007/0264930 A1 | 11/2007 | Daoudal | |
| 2007/0287452 A1 | 12/2007 | Pan et al. | |
| 2008/0005380 A1 | 1/2008 | Kawasaki et al. | |
| 2008/0039144 A1 | 2/2008 | Pan et al. |
| 2008/0108378 A1 | 5/2008 | Gessner et al. |
| 2008/0146158 A1 | 6/2008 | Pan et al. |
| 2008/0181188 A1 | 7/2008 | Aghvami et al. |
| 2008/0268830 A1 | 10/2008 | Sharma et al. |
| 2008/0285492 A1 | 11/2008 | Vesterinen |
| 2009/0201878 A1 | 8/2009 | Kotecha et al. |
| 2009/0205023 A1 | 8/2009 | Pan et al. |
| 2009/0227235 A1 | 9/2009 | Pan et al. |
| 2009/0232019 A1 | 9/2009 | Gupta et al. |
| 2009/0271491 A1 | 10/2009 | Pan et al. |
| 2009/0280853 A1 | 11/2009 | Brisebois et al. |
| 2009/0325584 A1 | 12/2009 | Pan et al. |
| 2009/0327819 A1 | 12/2009 | Pan et al. |
| 2010/0008306 A1 | 1/2010 | Pan et al. |
| 2010/0008369 A1 | 1/2010 | Pan |
| 2010/0027448 A1 | 2/2010 | Puthiyandyil et al. |
| 2010/0075668 A1 | 3/2010 | Pan et al. |
| 2010/0105373 A1 | 4/2010 | Kanade |
| 2010/0190470 A1 | 7/2010 | Raleigh |
| 2010/0197268 A1 | 8/2010 | Raleigh |
| 2010/0202455 A1 | 8/2010 | Sundaram et al. |
| 2010/0260157 A1 | 10/2010 | Buchholz et al. |
| 2011/0059740 A1 | 3/2011 | Pan et al. |
| 2011/0060853 A1 | 3/2011 | Pan et al. |
| 2011/0122824 A1 | 5/2011 | Muhanna et al. |
| 2011/0130135 A1 | 6/2011 | Trigui |
| 2011/0176536 A1 | 7/2011 | De Franca Lima et al. |
| 2011/0195743 A1 | 8/2011 | Jee et al. |
| 2011/0202589 A1 | 8/2011 | Piernot et al. |
| 2011/0223921 A1 | 9/2011 | Pan et al. |
| 2011/0275364 A1 | 11/2011 | Austin et al. |
| 2012/0002607 A1 | 1/2012 | Pan et al. |
| 2012/0051321 A1 | 3/2012 | De et al. |
| 2012/0094659 A1 | 4/2012 | Pan et al. |
| 2012/0106454 A1 | 5/2012 | Pan et al. |
| 2012/0147874 A1 | 6/2012 | Kotecha |
| 2012/0224474 A1 | 9/2012 | Beser |
| 2012/0224566 A1 | 9/2012 | O'Leary |
| 2012/0252444 A1 | 10/2012 | Pan et al. |
| 2012/0269167 A1 | 10/2012 | Velev et al. |
| 2012/0276866 A1 | 11/2012 | Sennett et al. |
| 2013/0028097 A1 | 1/2013 | Barrett |
| 2013/0029708 A1 | 1/2013 | Fox et al. |
| 2013/0039279 A1 | 2/2013 | Pan et al. |
| 2013/0065583 A1 | 3/2013 | Pan et al. |
| 2013/0130677 A1 | 5/2013 | Pan et al. |
| 2013/0148578 A1 | 6/2013 | Pan et al. |
| 2014/0154967 A1 | 6/2014 | Pan et al. |
| 2014/0173388 A1 | 6/2014 | Pan et al. |
| 2014/0315553 A1 | 10/2014 | Hoole |
| 2015/0181492 A1 | 6/2015 | Schmidt et al. |
| 2015/0319774 A1 | 11/2015 | Cai et al. |
| 2015/0358959 A1 | 12/2015 | Meshkati et al. |
| 2016/0182445 A1 | 6/2016 | Graffagnino et al. |
| 2017/0238229 A1 | 8/2017 | Schemagin et al. |

FOREIGN PATENT DOCUMENTS

| | | |
|---|---|---|
| EP | 2031920 A1 | 3/2009 |
| GB | 2452796 | 3/2009 |
| WO | WO 2007/044880 | 4/2007 |
| WO | WO 2009/100736 A1 | 8/2009 |
| WO | WO 2009/127965 A1 | 10/2009 |
| WO | WO 2014/031597 | 2/2014 |
| WO | WO 2014/031689 A1 | 2/2014 |
| WO | WO 2014/179235 | 11/2014 |

OTHER PUBLICATIONS

Kaul, et al.: "On the adpatation of commercial smartphones to tactical environments", Military Communications Conference, 2011, Nov. 7, 2011, pp. 2205-2210.

Nystromer, "Quicklink: A Portable 3G WCDMA Cellular Service, Deployed in Minutes" Presentation, Jun. 11, 2007, pp. 1-27.

Press Release: Harris Corporation Introduces Tactical 3G Cellular Network-in-a-Box for Warfighters, Published Apr. 19, 2011, http://harris.com/view_pressrelease.asp?pr_id=3230.

(56) References Cited

OTHER PUBLICATIONS

Press Release: Tecore Unveils The Mobile Industry's First 3G-4G Network in a Box (NIB), Published Feb. 14, 2011, http://www.tecore.com/newsevents/release.cfm?newsID=164.
Tecore Networks, The Mobile Industry's First All-In-One Network Solution Supporting WCDMA, HSPA+ and L TE, date of publication unknown, http://www.tecore.com/solutions/TecoreNetworks-Datasheet- 2G-3G-4G-NetworkInABox.pdf.
International Search Report and Written Opinion dated Feb. 11, 2014, International Application No. PCT/US2013/055864.
International Search Report and Written Opinion dated Nov. 8, 2013, International Application No. PCT/US2013/055721.
International Search Report and Written Opinion dated Sep. 26, 2014, International Application No. PCT/US2014/035732.

SECURE NETWORK ENROLLMENT

INCORPORATION BY REFERENCE TO ANY PRIORITY APPLICATIONS

This present application is a continuation of U.S. patent application Ser. No. 15/204,793, filed Jul. 7, 2016, entitled "SECURE NETWORK ENROLLMENT," which is incorporated herein by reference in its entirety. Any and all applications for which a foreign or domestic priority claim is identified in the Application Data Sheet as filed with the present application are incorporated by reference under 37 CFR 1.57 and made a part of this specification.

BACKGROUND

In some instances, networks administrators often desire to limit which users have access to a network in order to maintain network security. In addition, it can be difficult for a user to set up and communicate with a new network, especially if the network is a secure network.

SUMMARY

A user equipment (UE) can access a provisioning device to obtain network access data to access a primary network.

DETAILED DESCRIPTION

Figure 1:
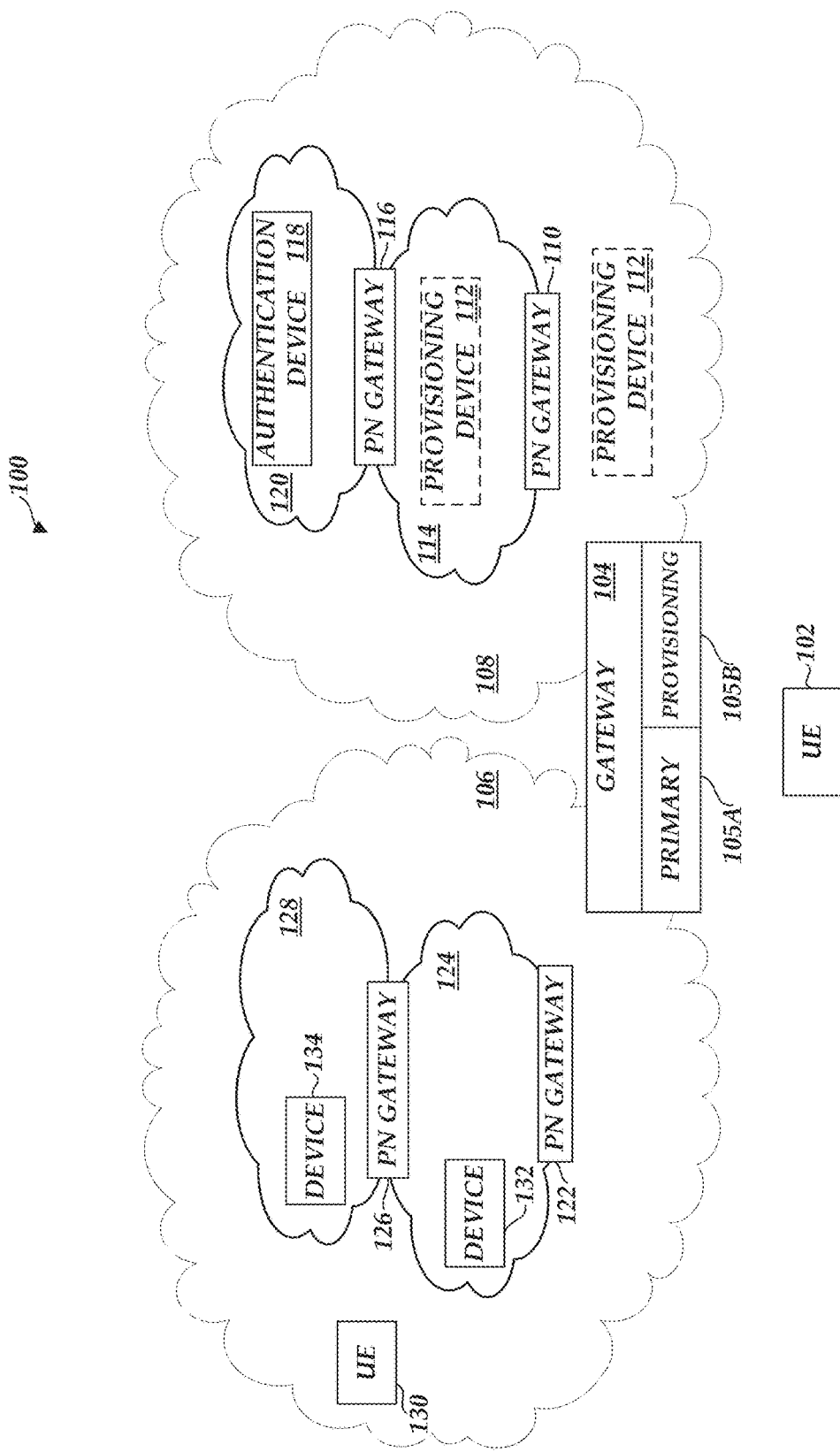
FIG. 1 is a diagram illustrative of an embodiment of an environment for accessing a primary network.

When a user equipment (UE) moves into, or is located in, a coverage area of a network (non-limiting examples: cellular network, other wireless network, or other network), the UE may be unable to access one or more endpoints (non-limiting examples: networks, computing devices, servers, applications, UE, etc.) that are available via the network because the UE lacks the proper information to access the endpoint. For example, the network may provide access to a secure network and the UE may lack the proper credentials to communicate with the secure network via a network gateway, which can also be referred to herein as a communication system. Additionally, the network administrator of the network may desire to minimize the number of users that have access to the endpoints in order to maintain the security of the endpoints and/or the network.

In some embodiments, a network gateway can provide access to multiple networks, including a primary network and a secondary network (non-limiting example: a provisioning network). In some cases, the network gateway provides access to the different networks using different access points or gateways (non-limiting examples: via a primary access point/gateway and a provisioning access point/gateway, respectively). In some cases, the different networks are used for the same type of data. For example, the primary network and secondary network can communicate any one or any combination of video data, Internet data, voice-over-IP (VOIP) data, audio data, file transfer data, text or short message service (SMS) data, multimedia or multi-media message service (MMS) data, etc. In certain embodiments, the primary network and primary access point can be unknown to a UE that desires to connect to it or to access an endpoint available via the primary network. In certain embodiments, the network gateway can form at least a portion of a mobile cellular network (MCN) communication system, which is described in greater detail below with reference to FIG. 2.

The UE can include provisioning network configuration data that enables the UE to access the provisioning network. The provisioning network configuration data can include the data and/or programs used by the UE to access the provisioning network, one or more private networks accessible via the provisioning network, and/or one or more devices accessible via the provisioning network/private networks. For example, the provisioning network configuration data can include any one or any combination of: a provisioning access point identifier, provisioning network identifier, provisioning and/or private network configuration parameters, certifications, applications, programs (e.g., VPN client program), proxy identifier, port, username, password, server identifier, multimedia message service center (MMSC) URL, multimedia message proxy address, multimedia port number, mobile country code (MCC), mobile network code (MNC), authentication type, access point type, access point protocol (e.g., IPv4, IPv6), bearer, mobile virtual network operator type, mobile virtual network operator value, etc. Furthermore, the provisioning configuration data can include any one or any combination of: additional VPN authentication credentials including but not limited to VPN server name/address, Internet key exchange (IKE) Key Type, IKE identify, IKE version requirement, split tunnel definition, suite B encryption settings, phase 1 settings, and Diffie-Helman groups, or other cryptographic keys, supported for one or more VPN tunnels, etc.

In response to receiving provisioning network configuration data, the network gateway can provide the UE with a network identifier for the provisioning network. Using the identifier for the provisioning network, the UE can obtain primary network configuration data (also referred to as network access data), which enables the UE to access the primary network and/or access or use an endpoint available via the primary network. For example, the UE can communicate with a provisioning device, which can obtain the primary network configuration data. In some embodiments, the UE accesses the provisioning device via a virtual private network (VPN) tunnel, and the provisioning device obtains the primary network configuration data via a second VPN tunnel. In some cases, the second VPN tunnel is established within the first virtual private tunnel.

The primary network configuration data can include the data and/or programs used by the UE to access the primary network, one or more private networks accessible via the primary network and/or one or more devices accessible via the primary network/private networks. For example, primary network configuration data can include any one or any combination of: a primary access point identifier, primary network identifier, primary and/or private network configuration parameters, certifications, applications, programs (e.g., VPN client program), proxy identifier, port, username, password, server identifier, multimedia message service center (MMSC) URL, multimedia message proxy address, multimedia port number, mobile country code (MCC), mobile network code (MNC), authentication type, access point type, access point protocol (e.g., IPv4, IPv6), bearer, mobile virtual network operator type, mobile virtual network operator value, etc. Furthermore, the configuration data can include any one or any combination of: additional VPN authentication credentials including but not limited to VPN server name/address, Internet key exchange (IKE) Key Type, IKE identify, IKE version requirement, split tunnel definition, suite B encryption settings, phase 1 settings, and Diffie-Helman groups, or other cryptographic keys, supported for one or more VPN tunnels, etc.

In some embodiments, the UE accesses the provisioning device without using a VPN tunnel, and, in certain embodiments, the provisioning device obtains the primary network configuration data via one or two virtual private network tunnels. When using two or more virtual private network tunnels, in some cases, one virtual private network tunnel can be within another virtual private network tunnel.

Once the UE receives the primary network configuration data, the UE can access the primary network. In some cases, the primary network configuration data can include private network configuration data, such as digital certifications or credentials, VPN client programs or applications, etc., that enables the UE to access one or more private networks via the primary network. In some embodiments, once the UE obtains access to the primary network, the UE can set up one or more VPN tunnels in order to communicate with the different private networks. In addition, the UE can communicate with endpoints accessible via the primary network.

Non-Limiting Example

As a non-limiting example, and with reference to FIG. 1, a network gateway 104 is accessible via a cellular network and provides access to a primary network 106 and a provisioning network 108. The primary network 106 is unknown to UE when UE initially communicate with the network gateway 104 (non-limiting examples: UE do not include primary network configuration data, such as an identifier for the primary network 106, to enable the UE to access the primary network 106), and the primary network 106 provides access to a highly secure network (HSN) 128 and other UE 130, a backhaul, a wide area network (WAN), such as the Internet, other endpoints, etc.

On the other hand, the provisioning network 108 can provide limited services and access for UE, such as only to a provisioning device 112, private network (PN) 114 and/or PN 120. Or the provisioning network 108 does not provide access to at least to one endpoint (non-limiting examples: UE, device, server, service, or network) that is accessible via the primary network 108.

The UE 102 is located in a wireless network coverage area (non-limiting example: a cellular network coverage area) that corresponds to the network gateway 104 and desires to communicate with the HSN 128 (in other embodiments, the UE 102 desires to communicate with another endpoint accessible via the primary network 106 but not accessible via the provisioning network 108), but lacks the proper credentials to access the HSN 128 and lacks the proper information regarding the primary network 106 (non-limiting example: primary network configuration data) to access the primary network 106.

However, the UE 102 includes provisioning network configuration data. For example, UE 102 includes an identifier for the provisioning network 106 (non-limiting examples: an access point identifier, access point name, network identifier, IP address, etc.), private network (PN) certifications in order to establish a VPN tunnel to communicate with a provisioning device 112 and/or includes an identifier for the provisioning device 112 that is accessible on the provisioning network 108 without establishing a VPN tunnel. Using the provisioning network configuration data, the UE 102 can access the provisioning network 108.

In some cases, the provisioning network 108 only provides access to the provisioning device 112 (and corresponding PN gateway 110 depending on the embodiment)—either directly on the provisioning network or via the PN 114 (non-limiting examples: no other servers, UE, devices, or services are available to UE 102 via the provisioning network 108). In certain embodiments, the provisioning network 108 can provide access to additional endpoints beyond the provisioning device 112, but may not provide access to at least one endpoint that is accessible via the primary network 106 (non-limiting example: one or more of the PNs 126, 128 or UE 130).

Once in communication with the UE 102, the provisioning device 112 can validate the UE 102 (and/or communicate with another device to validate UE 102) and provide the UE 102 primary network configuration data to enable the UE 102 to access the primary network 106, as well as the credentials to enable the UE 102 to access the HSN 128 (or other endpoint as mentioned above). In the event the provisioning device 112 (or other device) cannot validate the UE 102, the provisioning device 112 can provide the UE 102 with no information or with a rejection.

In some cases, the primary network configuration data can include services, applications, programs, or software that includes computer-executable instructions that can be executed by the UE 102 and/or provide additional functionality or capabilities for the UE 102, and as described above. For example, the primary network configuration data can include VPN client programs to enable the UE 102 to establish a VPN tunnel to one or more of the PNs 126, 128.

Using the primary network configuration data, the UE 102 can access the primary network 106. Once accessed, UE 102 can provide the proper credentials to access the HSN 128. In some cases in order to access the HSN 128, the UE 102 provides multiple private network credentials and/or establishes multiple VPN tunnels (non-limiting examples: accesses the PN 124). In some cases, the VPN tunnels are layered such that one VPN tunnel is established within another VPN tunnel (non-limiting example: UE 102 accesses the HSN 128 via the PN 124).

By validating the UE on the provisioning network 108 prior to providing the UE with access to the primary network 106 (and PNs 124, 128), the network gateway 104 can maintain the primary network 106 unknown to UE that are located within the coverage area of the network gateway 104 but lack permissions to access the primary network 106, and limit access to the primary network 106 to UE that have been validated.

Environment Overview

FIG. 1 is a diagram illustrative of an embodiment of an environment 100 for accessing a primary network. In the illustrated embodiment, the environment 100 includes a UE 102, a network gateway 104 that includes a provisioning gateway 105B for accessing a provisioning network 108 and a primary gateway 105A for accessing a primary network 106. The environment 100 in the illustrated embodiment further includes a first PN gateway 110, a provisioning device 112, accessible in the provisioning network 108 and/or in a first (virtual) private network 114 or PN 114, a second PN gateway 116, an authentication device 118 accessible within a second (virtual) private network 120 or PN 120, a third PN gateway 122 that provides access to one or more endpoints (e.g., computing device 132) within a third (virtual) private network 124, and a fourth PN gateway 126 that provides access to one or more endpoints (e.g., computing device 134) within a fourth (virtual) private network 128.

The UE 102 can be implemented using one or more, cell phones, smart phones, tablets, computers, laptops, tracking devices, targeting devices, weapons systems, mobile computing device, and/or any electronic device configured to communicate with a network (non-limiting examples: a cellular network or other wireless network, or wired network). As such, the UE 102 can include a processor and data store (non-limiting example: non-transitory computer-readable media) that includes computer-executable instructions that when executed by the processor cause the processor to perform a number of functions, programs, applications, and/or services. The UE can also include a transceiver and an antenna to provide wireless communication using one or more radio bands, as well as a screen, input and output components, etc.

In addition, the UE 102 can include a provisioning component implemented using the processor and computer-executable instructions. In some embodiments, the provisioning component can include data, such as provisioning network configuration data (non-limiting examples: an access point of the provisioning network, the location and identification of the provisioning device, one or more PN credentials in order to access the provisioning device, etc., as described in greater detail above). Furthermore, the provisioning component can include computer-executable instructions to enable the UE 102 to access the provisioning network 108 and/or provisioning device 112, set up one or more VPN tunnels to communicate with the provisioning device 112, receive primary network configuration data, connect to the primary network 106, access one or more PNs 124, 128 within the primary network 106, etc., as will be described in greater detail herein.

Although described as forming part of the UE 102, it will be understood that the provisioning component can be implemented in a device other than the UE 102. For example, the provisioning component can be implemented in the network gateway 104, a provisioning device 112 in communication with the UE 102, or other communication device or system, etc.

The network gateway 104 can be implemented as an MCN communication system, described in greater detail below with reference to FIGS. 2 and 3, or a portion thereof, such as a PGW of the MCN communication system. In some embodiments, the network gateway 104 can be implemented separately from the MCN communication system, such as a base station, PGW, or gateway, of a cellular network, a modem, router, firewall, or server, or other device that can communicate with the UE 102 via wired or wireless communication, assign network identifiers to the UE 102, and/or provide the UE 102 access to other networks or devices. In some embodiments, the network gateway 104 can be a VPN gateway and be configured to pass, block, or route VPN traffic and can provide networking services such as IP address assignment and management, dynamic and static routing, and the maintenance of routing tables, etc.

The primary gateway 105A can form at least a portion of the network gateway 104 and can provide the UE 102 with access to the primary network 106, as well as to one or more UE 130, other devices (not shown), private networks 124, 128, the Internet, etc. In some embodiments, the primary gateway 105A can be identified using an identifier associated with the primary network 106 (non-limiting examples: access point identifier, access point name, network name, network identifier, device identifier, device name, IP address, etc.). In some cases, the primary network 106 may not provide access to the provisioning device 112. In certain embodiments, the primary gateway 105A and primary network 106 are unknown to the UE 102 when the UE initiates a connection with the network gateway 104. For example, the UE 102 may not include primary network configuration data (non-limiting examples: an access point identifier, access point name, IP address, network configuration parameters, private network access credentials, etc., as described in greater detail above) to enable the UE 102 to communicate with the primary gateway 105A and/or access the primary network 106.

The provisioning gateway 105B can form at least a portion of the network gateway 104 and can provide the UE 102 with access to the provisioning network 108. In some embodiments, the provisioning gateway 105B can be identified using an identifier associated with the provisioning network 108 (non-limiting examples: access point identifier, access point name, network name, network identifier, device identifier, device name, IP address, etc.).

The provisioning network 108 can provide the UE 102 with limited access to other devices, networks, etc. For example, in some embodiments, the provisioning network 108 only provides the UE 102 with access to the PN 114 and/or the provisioning device 112. In certain embodiments, the provisioning network does not provide the UE with access to the PN 120, or other devices, UE, servers, WAN, the Internet, or other endpoints. As such the provisioning network can be a very limited network with few services or endpoints available to the UE 102. However, it will be understood that in some embodiments, the provisioning network 108 can provide the UE 102 with access to a number of private networks, devices, UE, the Internet, other endpoints, etc., but may lack access to at least one endpoint that is accessible via the primary network 106, such as the PNs 124, 128 or endpoints therein.

The PN gateways 110, 116, 122, 126 can be implemented similar to the network gateway 104 and enable access to their respective private networks 114, 120, 124, 128. For example, the PN gateways 110, 116, 122, 126 can be configured to validate the UE 102 for a particular PN 114, 120, 124, 128 and provide the UE 102 with an identifier for the PN 114, 120, 124, 128. In addition, the PN gateways 110, 116, 122, 126 can be configured to pass, block or route VPN traffic and provide networking services such as IP address assignment and management, dynamic and static routing and the maintenance of routing tables, etc.

In some embodiments, the UE 102 includes one or more applications, such as a VPN client application, to communicate with the PN gateways 110, 116, 122, 126 and establish a VPN tunnel to the respective PN 114, 120, 124, 128. In some cases, a VPN tunnel can provide authentication and data encapsulation within an encrypted tunnel. In certain cases, VPN tunnels can be nested to provide multiple layers of encryption for each byte of data that is transmitted and received. The VPN client application can use one or more certifications, credentials, identifiers, and/or passwords to establish the VPN tunnel. In some cases, a separate VPN client application is used for each PN that the UE 102 accesses or for multiple PNs that the UE 102 accesses.

The provisioning device 112 and/or authentication device 118 can be implemented as dedicated respective servers/workstations, embedded devices, mobile devices, or a separate service (or virtual machine) on a shared server that provides hosting for a communications service, that can communicate with each other and/or the UE 102, use identification data to authenticate and/or validate the UE 102 for a primary network, and provide the UE 102 with primary network configuration data to enable the UE 102 to access the primary network 108.

In some embodiments, the provisioning device 112 and authentication device 118 can reside in different private networks and communicate with each other via one or more VPN tunnels using associated private network identifiers. In certain embodiments, the provisioning device 112 and authentication device 118 can reside in the same network and/or be implemented on a single device. In some embodiments, the provisioning device 112 is not accessible via the primary network 106 and in certain embodiments, is only accessible via the provisioning network 108.

In some cases, the provisioning device 112 communicates the identification data received from the UE 102 to the authentication device 118. In such embodiments, the authentication device 118 can use the identification data to authenticate the UE 102 for the primary network 106. For example, the authentication device 118 can compare the identification data with identification data of UE that are to have access to the primary network. If there is a match, the provisioning and/or authentication device 118 can authenticate the UE for the primary network 106. In certain embodiments, the authentication device 118 authenticates the UE 102 by verifying that the UE 102 has the correct authentication values. For example, the authentication device 118 can validate the UE 102 request using one or more parameters such as, but not limited to, device international mobile station equipment identity (IMEI), private and shared user/password combinations, installed certificate authority certificates, installed user certificates, or by user prompted credentials.

In some embodiments, the authentication device 118 provides primary network configuration data to the provisioning device 112, which provides the information to the UE 102. In certain instances, the authentication device 118 encrypts the primary network configuration data using data from the UE 102. In some circumstances, the authentication device 118 encrypts the primary network configuration data such that the provisioning device 112 is unable to decrypt it. In some cases, the authentication device 118 can use the identification data to encrypt the primary network configuration data. For example, the identification data can include an encryption key or token that can be used to encrypt the primary network configuration data or one or more UE identifiers can be used to encrypt the data (non-limiting examples: device identifier, device name, SIM, MAC address, serial number, etc.).

In certain cases, the authentication device 118 and/or provisioning device 112 can provide the network gateway 104 with subscription or other data regarding the UE 102. The network gateway 104 can use the received data to update one or more subscription, user, or other databases so that the network gateway 104 can identify or authenticate the UE and/or permit the UE to access the primary network 108 upon request.

It will be understood that the environment 100 can include fewer or more components as desired and/or be configured differently than what is shown in FIG. 1. For example, in some embodiments, the environment 100 can omit any one or any combination of the PN gateways 110, 116, 122, 126 or PNs 114, 120, 124, 128. In some embodiments, the primary network configuration data enables the UE 102 to access the primary network 106, but not the PNs 124, 128. In certain cases, the provisioning device 112 can be implemented as part of the network gateway 104.

In certain embodiments, the provisioning device 112 and/or the authentication device 118 can be located in the same PN, such as PN 114, or outside the PNs 114, 120, but accessible within the provisioning network 108. Although illustrated as being outside the PN 114, it will be understood that in some embodiments, the PN 120 is located within, or accessible via only, the PN 114. Similarly, in certain cases, the PN 128 can be accessible only through the PN 124.

In some embodiments, communications between the provisioning device 112 and the authentication device 118 can occur using a VPN tunnel that is established within another VPN tunnel. Furthermore, although illustrated as being separate networks, in some embodiments, one or more PNs can form part of the same private network. For example, the PNs 120, 128 can form part of the same private network, which can be a highly secure network, and accessible via a VPN tunnel within a second VPN tunnel (non-limiting examples: accessible via the PN 114 and/or the PN 124.

MCN Communication System Overview

A cellular network typically includes multiple stationary antennas, base stations, or the like, in different locations that communicate with a mobile telephone switching office (MTSO) and/or one or more core network components (generally referred to as the core or core network) that are remotely located from the different base stations. The MTSO or mobile core determines how calls are routed between the base stations and enables the base stations to communicate with each other for handover purposes. If a base station cannot communicate (non-limiting example: via a backhaul) with the MTSO or mobile core, or the rest of the network, all communications at that base station are lost and user equipment (UE) in corresponding network areas cannot communicate with other UE, even if the UE trying to communicate with each other are in the same network area. In addition, the base stations are built to be stationary so that UE within a particular geographic area always have network access.

When a user moves from one network to another network, the mobile cores of the two networks communicate with each other to handle the handover and other configuration details (non-limiting example: a core network component of the first cellular network communicates with a core network component of the second cellular network). In addition to communicating for handover purposes, core network components from different cellular networks may also communicate in order to route data (non-limiting examples: voice data, video data, application data, control data, etc.) from a user in a first cellular network to another user in a second cellular network.

Figure 2:
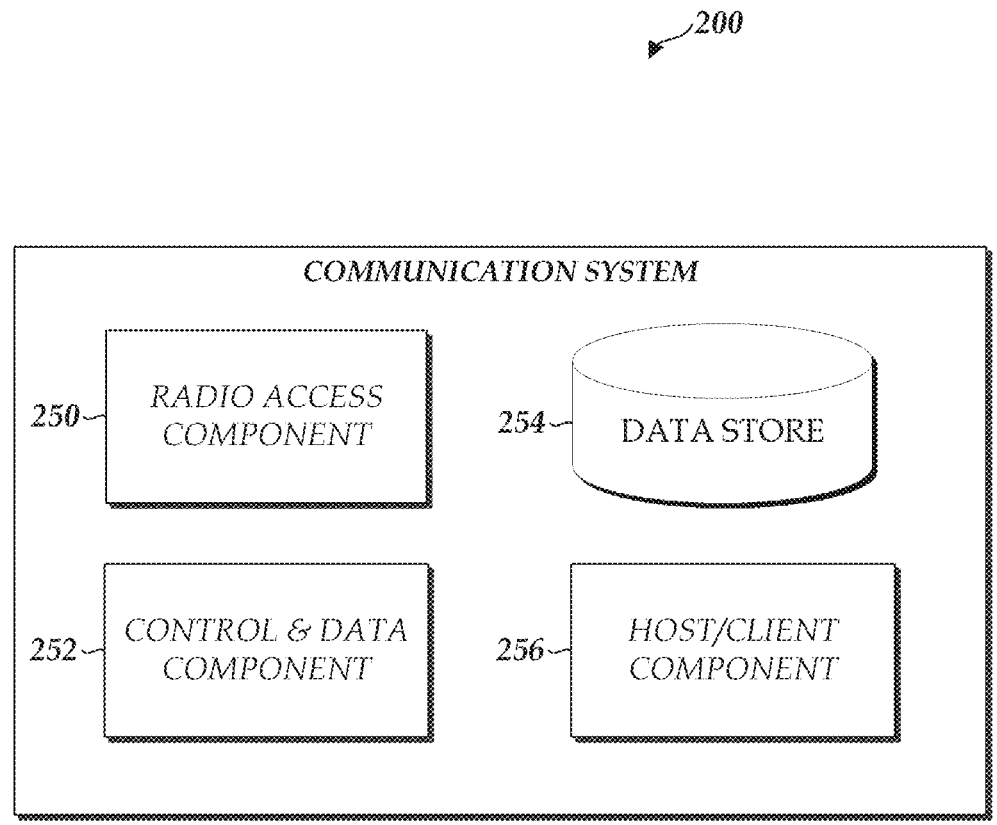
FIG. 2 is a block diagram of an embodiment of a MCN communication system

FIG. 2 is a block diagram of an embodiment of a mobile cellular network (MCN) communication system 200 that can independently provide a cellular network that is mobile. In the illustrated embodiment, the MCN communication system 200 includes a radio access component 250, which can be used to send/receive wireless communication to/from the MCN communication system 200, a control and data component 252, and a data store 254. The MCN communication system 200 can include fewer or more components as desired and as described in greater detail in U.S. application Ser. Nos. 13/972,112 and 14/264,297. For example, the MCN communication system 200 can include and/or can communicate with an antenna, satellite dish, and the like, to receive data from UE or other endpoints, other MCN communication systems, satellites, and the like. In certain embodiments, the MCN communication system 200 can communicate with multiple eNodeBs, base stations, or the like, to increase its coverage area. In addition, in an IP network architecture, the received/transmitted data can all be in the form of IP data packets.

One or more MCN communication systems can be deployed in areas where cellular networks are not available and each MCN communication system can independently provide a self-contained cellular network that is portable during operation for devices in respective coverage areas. In some cases, multiple MCN communication systems can be networked together to create a network of MCN communication systems, also referred to herein as a NOM, as described in greater detail in U.S. application Ser. Nos. 13/972,112 and 14/264,297, entitled Mobile Cellular Networks and Mobile Cellular Network Backhaul, respectively, each of which is incorporated by reference herein in its entirety. The different MCN communication systems within the NOM or between NOMs, can communicate with each other via a backhaul using a variety of communication technologies, including satellite communication, microwave or radio wave communication, OFDM, WiMAX, LTE, etc., as described in greater detail in U.S. application Ser. Nos. 13/972,112 and 14/264,297, incorporated herein by reference, and, in some cases, NOMs can communicate with each other. As further described in U.S. application Ser. Nos. 13/972,112 and 14/264,297, incorporated herein by reference, when networked together, some MCN communication systems can be configured as master devices or hosts and other MCN communication systems can be configured as secondary devices, clients and/or relays.

In some embodiments, each of the components of the MCN communication system 200 can include an identifier, such as an IP address, MAC address, etc. Furthermore, in certain embodiments, the MCN provided by the MCN communication system 200 can include one or more network identifiers, such as access point names, etc. In some embodiments, different types of data can be associated with different access point names. For example, voice-over-IP (VOIP) data can be associated with one access point of the MCN communication system, Internet data can be associated with a different access point of the MCN indication system, etc. Similarly, video data, video data, audio data, file transfer data, text or short message service (SMS) data, multimedia or multimedia message service (MMS) data, etc., can each be assigned to a different APN, or grouped together in any combination on the same APN, as desired. In some cases, the use of different APNs can be based on network policy, such as, but not limited to, treatment of different types of packets or data, treatment of different users. In certain cases, the use of different APNs can be based on billing systems (e.g., the ability to charge for different types of data), carrier grade redundancy (e.g., making data paths for some type of data more resilient than others, such as to make voice data more reliable than Internet data). Furthermore, in some cases, some types of data can be blocked, such as during authentication, depending on the network deployment. Packets sent over the network can use the network identifiers of the MCN communication system to identify the MCN communication that is to process the packet and/or that can access a particular destination, etc.

In some embodiments, the MCN communication system can include a primary access point and a provisioning access point. The primary access point can provide access to the primary network 106 and the provisioning access point can provide access to the provisioning network 108. The provisioning network 108 can be used to validate and authenticate a UE and provision the UE with credentials to access a private network (non-limiting example: HSN 128) via the primary network 106. In some cases, the primary access point and primary network 106 can be unknown to UE when they initially attach or communicate with the MCN communication system 200. Thus, in certain embodiments, to gain access to the primary network, the UE communicate with a provisioning device accessible via the provisioning network 108.

In some embodiments, the MCN communication system 200 can function in an independent mode where communication with other MCN communication systems or a backhaul communication is limited or non-existent. In such embodiments, upon receiving a packet of data, the first MCN communication system can refer to a look-up table stored in a data storage device to determine whether a destination identifier of the packet is within its covered area. If the destination is within the covered area (non-limiting examples: an endpoint within the covered area, a component of the MCN communication system, etc.), the MCN communication system can transmit the data to the destination. The data can include any one or more types of communications, including, but not limited to, user plane data (non-limiting examples: voice data, video data, e-mail, SMS data, picture data, files, requests for information, etc.) or control plane data. If the first MCN communication system determines that the destination is not within its covered, the first MCN communication system can transmit a message to the source that communication with the destination is not available, etc.

The MCN communication system can also function in a networked mode such that communication with a destination is available even if the destination is not located within the MCN communication system's covered area. In some instances, the destination may be accessible via the Internet (non-limiting examples: via satellite or wired communication), microwave communication, LTE backhaul, or other form of backhaul technology, etc.

As will be described in greater detail below, multiple MCN communication systems can be related together. In addition, in certain embodiments, when in the networked mode multiple MCN communication systems can be associated together and/or networked together as described in greater detail in U.S. application Ser. No. 13/972,112, previously incorporated herein by reference in its entirety.

Furthermore, when related together, the MCN communication systems can have different functionality depending on their relationship with the other MCN communication systems. For example, as described in greater in U.S. application Ser. Nos. 13/972,112 and 14/264,297, incorporated herein by reference, when related together, one of the MCN communication systems can be designated as a host MCN communication system or Master Device, while the remaining MCN communication systems can be designated as client MCN communication systems, relay MCN communication systems, and/or Secondary Devices.

Furthermore, when multiple MCN communication systems are networked together, a UE can move from the covered area of a first MCN communication system to the covered area of a second MCN communication system without disrupting the service of the UE. As the UE moves from the first MCN communication system to the second MCN communication system, the first and second MCN communication system can effectuate a handover that updates which MCN communication system is the local MCN for the UE. For example, as part of the handover routine the UE can establish a first cellular communication link with the first MCN communication system and terminate a second cellular communication link with the second MCN communication system. Any MCN communication systems to which the UE is registered (non-limiting example: a registered MCN communication system) can similarly update its routing table and any session identifiers in order to continue providing a communication pathway or link for the UE.

With continued reference to FIG. 2, the control and data component 252 can be implemented using one or more computer processors, FPGAs, microcontrollers, etc., and can perform the various operations of the MCN communication system 200. In an IP network architecture, such as 4G LTE, the control and data component 252 can include a packet data network gateway (PGW), serving gateway (SGW), mobility management entity (MME), and policy and charging rules function (PCRF).

The PGW can provide the IP traffic interface between the UE and external IP networks. Together with the SGW, the PGW can route all IP packets between the UE and the external IP network. The PGW can perform policy enforcement, packet filtering for each UE, charging support, packet screening, quality of service, EPS network support, static policy, IPv4 packet data network (PDN), and network address support. The PGW can also provide support for mobility between 3GPP and non-3GPP technologies such as WiMAX and 3GPP2, etc.

The SGW can route and forward user data packets, and work with the PGW to handle user data between the radio access component and external IP networks. The SGW can route the user data from the UE to the PGW or from the PGW to the UE, and provide support during inter-MCN communication system handovers. For idle state UE, the SGW can terminate the downlink data path and trigger paging when downlink data arrives for the UE. The SGW can also manage and store UE contexts, e.g. parameters of the IP bearer service, network internal routing information.

The MME can be responsible for attaching and detaching a UE from the MCN communication system and authenticating the user (by interacting with the home subscriber server (HSS), described in greater detail below). Furthermore, the MME can be responsible for choosing the SGW and PGW for a UE, and can manage PDN connections. In addition, the MME can be responsible for UE tracking and paging procedures including retransmissions.

The PCRF can provide network control regarding the service data flow detection, gating, quality of service, and flow based charging towards a Policy and Charging Enforcement Function (PCEF) contained in the PGW. The PCRF can contain a database holding dynamic policy and charging rules information for the MCN communication system.

Similarly, the control and data component 252 can perform the attachment and detachment of UE, authentication procedures, gateway selection, managing PDN connections, UE tracking and paging, etc. The control and data component 252 can also handle the user data between the radio access component and an external IP network, packet routing and forwarding, handover functions between MCN communication systems, packet buffering initiation of network triggered service request procedures, quality of service policy enforcement, static policy, subscriber location management, subscriber data, and the like. In addition, the control and data component 252 can perform additional procedures as described in greater detail in U.S. application Ser. No. 13/972,112, previously incorporated herein by reference.

The data store 254 can include data regarding the UE in communication with the MCN communication system 200 and within the coverage area corresponding to the MCN communication system 200, such as UE location, authentication keys, etc. In some embodiments, such as IP network architecture, such as a 4G LTE network, the data store 254 can include a home subscriber server (HSS). In addition, the data store 254 can include information regarding other MCN communication systems that are registered with the MCN communication system 200.

The HSS can include subscription information for all UE (including client MCN communications systems that are registered as UE) associated with the MCN communication system, such as all the UE located within the covered area of a MCN communication system and/or the UE located within the covered area of related or associated MCN communications systems. The HSS can store, for example, authentication parameters, security keys, and subscription information for UE within the MCN of the MCN communication system or associated with the MCN communication system. Furthermore, the HSS can include subscriber location information and be involved with subscriber data handling, authentication procedures, etc.

Similarly, the data store 254 can further include data identifying other related MCN communication systems. In some cases, the data identifying the other related MCN communication systems can be used to communicate with the other MCN communication systems.

Figure 3:
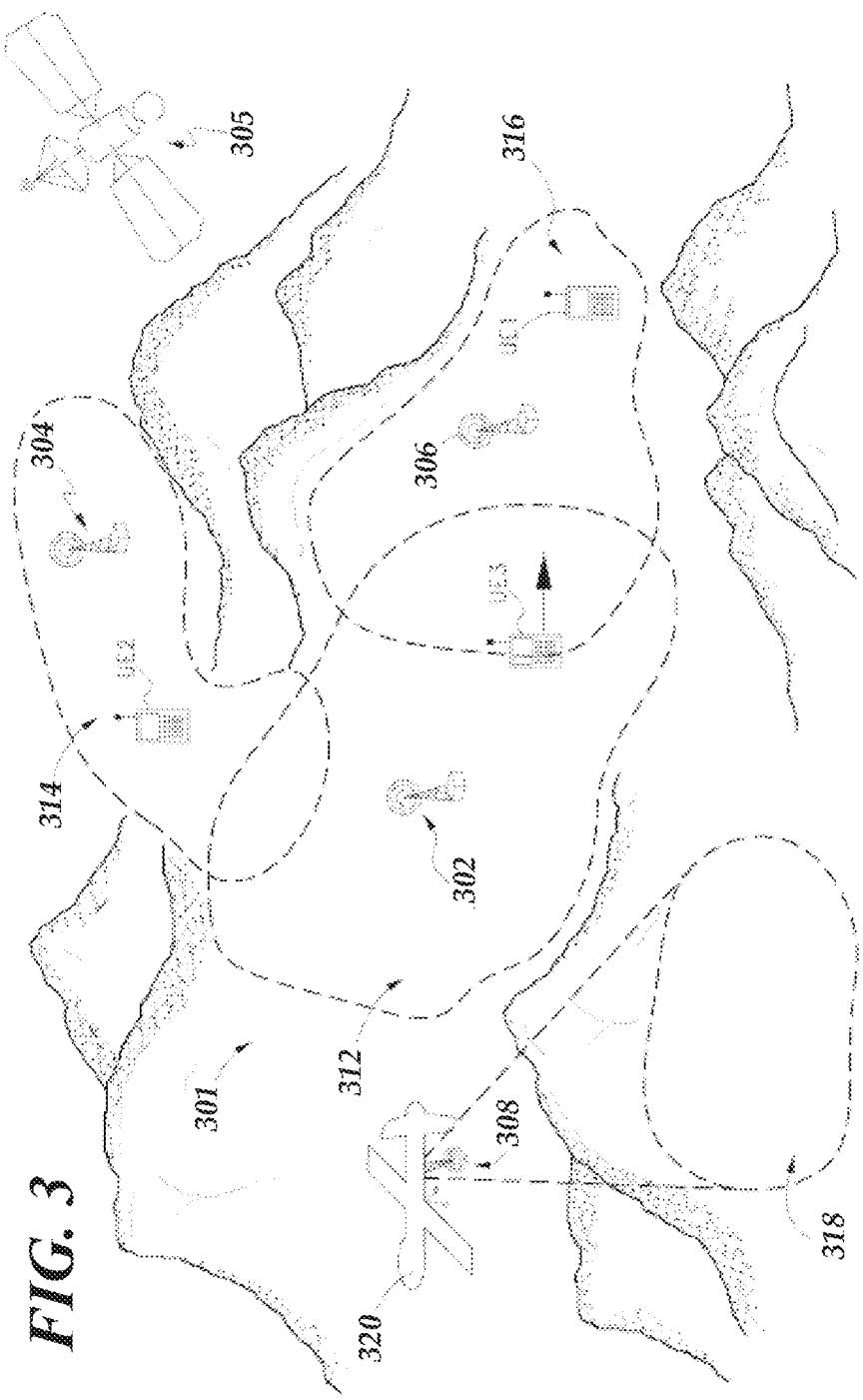
FIG. 3 is a diagram of an embodiment of multiple MCN communication systems

FIG. 3 is a diagram of an embodiment of multiple MCN communication systems 302, 304, 306, 308 and their corresponding coverage areas 312, 314, 316, and 318, respectively. As described above and in greater details in U.S. application Ser. Nos. 13/972,112 and 14/264,297, incorporated herein by reference, the MCN communication systems 302, 304, 306, 308, in some embodiments can be networked together to form a NOM.

In the illustrated embodiment, some of the coverage areas 312, 314, 316 are managed by MCN communication systems 302, 304, 306 that are on the ground. However, as illustrated with MCN communication system 308, the MCN communication systems can be located on a moving object, such as an airplane, drone 320, automobile, ship, boat, or other vehicle. As such the coverage areas can move with the MCN communication system. Furthermore, as illustrated, the coverage areas 312, 314, 316 are adjacent to each other, while coverage area 318 is not adjacent to any of the other coverage areas.

The MCN communication systems 302, 304, 306, and 308 can communicate with each other via any one, or any combination, of satellite communication via satellite 305, microwave, or radio wave communication, OFDM, WiMAX, LTE backhaul, etc.

The illustrated embodiment of FIG. 3 further includes UE 102 located within coverage area 316, UE2 located within coverage area 314, and UE3 located within overlapping coverage areas 312 and 316 and moving towards MCN communication system 306.

Network Enrollment

Figure 4A:
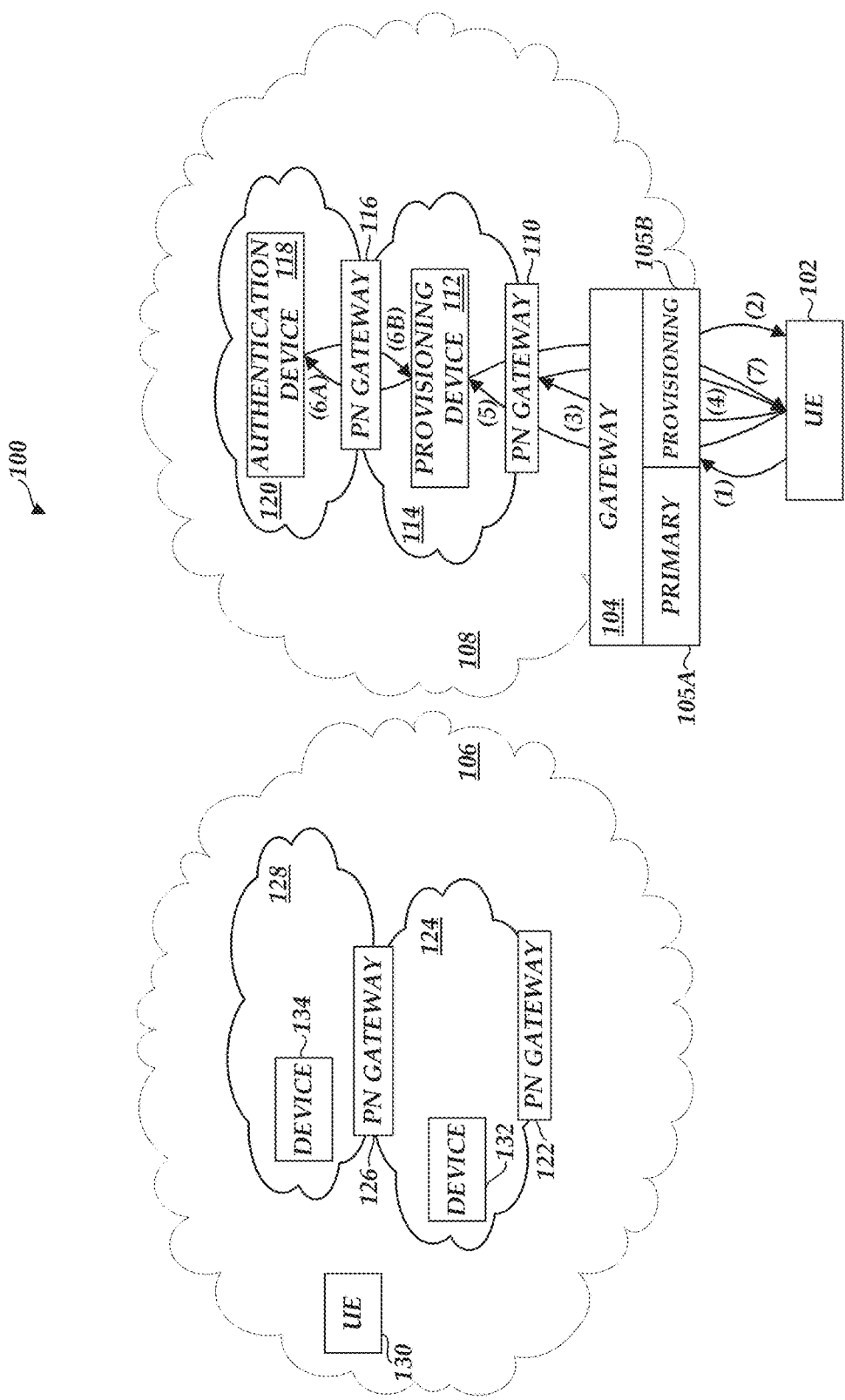
FIG. 4A is a data flow diagram illustrative of an embodiment of communications between various devices to obtain primary network configuration data.

FIG. 4A is a data flow diagram illustrative of an embodiment of communications between various devices within the environment 100 to obtain primary network configuration data.

At (1), the UE 102 communicates with the network gateway 104. In some cases, as part of the communication, the UE 102 provides an access point to, or requests an access point from, the network gateway 104 and requests network access. In the illustrated embodiment of FIG. 4A, the UE 102 requests access to the provisioning network by providing a provisioning access point to the network gateway 104. However, it will be understood that the UE 102 can request access to the provisioning network or any other network in a variety of ways. In some embodiments, the UE 102 communicates with the network gateway 104 once a network corresponding to the network gateway 104 is detected and without user interaction with the UE 102. In certain embodiments, the UE 102 initiates communication based at least in part on user interaction in which the user requests access to the primary network and/or data or a computing device that is accessible via the primary network.

At (2), the UE 102 receives a network identifier from the network gateway 104. In some embodiments, the network identifier includes an IP address and/or other identifier. However, it will be understood that a variety of network identifiers can be used and/or sent to the UE 102.

At (3), using the network identifier, the UE 102 communicates with the PN gateway 110 to establish a VPN tunnel. In some cases, the UE 102 can provide PN authentication information in order to set up the VPN tunnel with the PN gateway 110. In addition, in some embodiments, the UE 102 can automatically communicate with the PN gateway 110 based at least in part on receipt of the network identifier without any further user interaction with the UE 102. In some embodiments, the UE 102 communicates with the PN gateway 110 based at least in part on a user initiating an application or other computer-executable instructions or on the user interacting with the UE 102 to request access to the provisioning device 112, the PN gateway 110, the primary network, a private network available via the primary network and/or a computing device available via the primary network.

At (4) the UE 102 receives a PN identifier. In some embodiments, the PN identifier includes an IP address. However, it will be understood that a variety of network identifiers can be used and/or sent to the UE 102.

At (5), using the PN identifier, the UE 102 communicates with the provisioning device 112 within the provisioning network (or first PN). In certain embodiments, the UE 102 provides identification data to the provisioning device 112. The identification data can include, but is not limited to, a MAC address, SIM card information, serial number, certifications, certificate authority information, user certificate information, username, password, password-derived keys, hashes, salted hashes of unique device properties and/or user passwords, etc. In addition, in some embodiments, the UE 102 automatically communicates with the provisioning device 112 upon receipt of the PN identifier without any further user interaction with the UE 102.

At (6A) and (6B), the provisioning device 112 validates the UE 102 with an authentication device 118. In some embodiments, the provisioning device 112 communicates the identification data to the authentication device 118. The authentication device 118 can be located within the provisioning network and/or can be accessible via another PN. In some embodiments in which the authentication device 118 is located in another network, the provisioning device 112 can maintain a VPN tunnel with the other PN and/or set up a VPN tunnel upon receipt of the identification data or communication with the UE 102, and can communicate with the authentication device 118 using the corresponding PN identifier. In certain instances, the VPN tunnel between the provisioning device 112 and the authentication device 118 can be established within the first VPN tunnel. In some cases, the provisioning device 112 validates the UE 102 without communication to another server or device.

Once the UE 102 is authenticated, the authentication device 118 can provide the provisioning device 112 with primary network configuration data. However, it will be understood that in some embodiments, the provisioning device 112 can obtain the primary network configuration data without communicating with the authentication device 118. The primary network configuration data can include, but is not limited to, a primary access point or other primary network access information, credentials for access to one or more PNs that are accessible via the primary network, etc., as described in greater detail above). In some embodiments, the primary network configuration data is encrypted when it is communicated to the provisioning device 112. In certain embodiments, the primary network configuration data is encrypted such that the provisioning device 112 cannot access the primary network configuration data. In some cases, the authentication device 118 can use the identification data to encrypt the primary network configuration data.

At (7), the provisioning device 112 communicates the primary network configuration data to the UE 102 via the network gateway 104. Although not illustrated, in some embodiments, the first VPN tunnel is terminated based at least in part on the receipt of the primary network configuration data or some other event (non-limiting example: receipt of a primary network identifier described below). In such embodiments, the UE 102 can delete and/or discontinue the use of the network identifier associated with the first PN or provisioning network.

In some cases, the provisioning device 112 can also provide the network gateway 104 with subscription data regarding the UE 102. The provisioning device 112 can store or generate the subscription data and/or receive it from the authentication device 118 or some other device. In some embodiments, the provisioning device 112 and/or authentication device 118 uses the identification data to generate the subscription data. The network gateway 104 can use the subscription data to update one or more user, subscription or other databases to enable the network gateway to identify the UE 102 and/or allow the UE 102 to access the primary network 106 upon request. In some cases, the subscription data can include an identifier associated with the UE, such as a device identifier, device name, SIM, MAC address, serial number, etc., or other data to enable the network gateway 104 to identify the UE 102 for access to the primary network 106.

Depending on the embodiment, certain acts, events, blocks, communications or functions identified above can be performed in a different sequence, can be added, merged, or left out altogether (non-limiting example: not all described operations or events are necessary). Moreover, in certain embodiments, operations or events can be performed concurrently, e.g., the provisioning device 112 can establish a VPN tunnel with the authentication device 118 while the UE 102 concurrently establishes a VPN tunnel to the first PN. In some embodiments, the network gateway 104 can provide the UE 102 with a network identifier at the same time that it forwards that UE's 102 identification data to the PN gateway 110. Furthermore, in some embodiments, the primary data information may not include authentication information to access the PNs 124, 128. In such embodiments, the UE 102 may not seek access a PN via the primary network, or seek access to one PN 124 but not to the second PN 128 via the primary network.

Furthermore, any one or any combination of the activities described above can occur automatically and/or without user input. For example, the UE 102 can detect the network gateway 104, access the provisioning network 108, establish a VPN tunnel to the PN 114, receive the primary network configuration data, and/or shutdown the VPN tunnel to the PN 114, and/or cease use or delete the provisioning network identifier or the PN identifier without user input. Similarly, the provisioning device 112 can establish a VPN tunnel to the authentication device 118 and/or provide the primary network configuration data to the UE without user input. In addition, the authentication device 118 can authenticate the UE, encrypt the primary network configuration data, and/or provide the encrypted (or unencrypted) primary network configuration data to the provisioning device without user input.

Figure 4B:
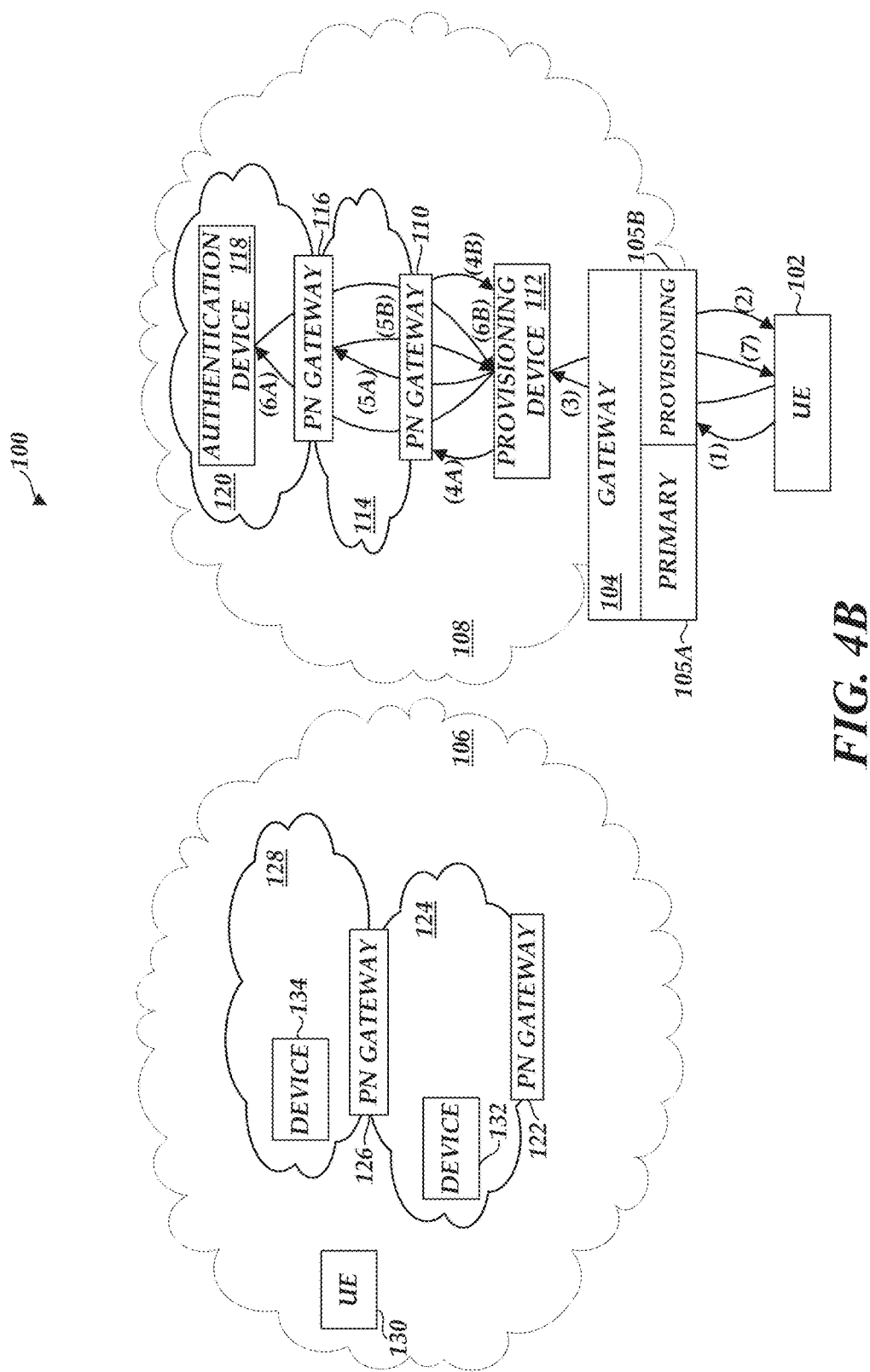
FIG. 4B is a data flow diagram illustrative of another embodiment of communications between various devices to obtain primary network configuration data.

FIG. 4B is a data flow diagram illustrative of another embodiment of communications between various devices within the environment 100 to obtain primary network configuration data. The configuration of the components of the environment 100 is similar to the configuration illustrated in FIG. 4A, except that the provisioning device 112 is located outside the first PN 114. As described previously with reference to FIG. 4A, it will be understood that the environment 100 can include fewer or more components as desired and/or be configured differently than what is shown in FIG. 4A or 4B. For example, in some embodiments, the environment 100 can omit the first PN gateway 110, the first PN 114, the second PN gateway 116, and/or the second PN 120, and the authentication device 118 can be located in the same network as the provisioning device or be omitted as well.

At (1) and (2) the UE 102 communicates with the network gateway 104 and receives a network identifier, similar to (1) and (2) of FIG. 4A, described in greater detail above.

At (3), using the network identifier, the UE 102 communicates with the provisioning device 112. In certain embodiments, as part of the communication, the UE 102 provides identification data to the provisioning device 112, as described in greater detail above with reference to FIG. 4A.

At (4A), the provisioning device 112 communicates with a first PN gateway 110 to establish a first VPN tunnel. In some cases, the UE 102 can provide the provisioning device 112 with first PN authentication data in order for the provisioning device to establish the first VPN tunnel with the first PN gateway 110. In certain embodiments, the provisioning device 112 establishes the first VPN tunnel with the first PN gateway 110 without authentication data from the UE 102. For example, in some embodiments, the provisioning device 112 establishes the first VPN tunnel prior to communications received from the UE 102. In certain embodiments, the provisioning device 112 can establish the first VPN tunnel based at least in part on receiving a communication from the UE 102. At (4B) the provisioning device 112 receives a first PN identifier.

At (5A), using the first PN identifier, the provisioning device 112 communicates with a second PN gateway 116 to establish a second VPN tunnel. In some cases, the UE 102 can provide the provisioning device 112 with second PN authentication information in order for the provisioning device 112 to establish the second VPN tunnel with the second PN gateway 116. In certain embodiments, the provisioning device 112 establishes the second VPN tunnel with the second PN gateway 116 without authentication information from the UE 102. For example, in some embodiments, the provisioning device 112 establishes the second VPN tunnel prior to communications received from the UE 102. In certain embodiments, the provisioning device 112 can establish the second VPN tunnel based at least in part on receiving a communication from the UE 102. At (5B), the provisioning device 112 receives a second PN identifier.

At (6A) and (6B), using the second PN identifier, the provisioning device 112 validates the UE 102 with an authentication device 118 located within the second PN 120, and receives primary network configuration data, as described in greater detail above. In some embodiments, as part of the validation, the provisioning device 112 communicates the identification data to the authentication device 118.

At (7), the provisioning device 112 communicates the primary network configuration data to the UE 102 via the network gateway 104. Although not illustrated, in some embodiments, upon communicating the primary network configuration data to the user equipment, the provisioning device 112 terminates the first and second VPN tunnels. In such embodiments, the provisioning device 112 can delete and/or discontinue the use of the network identifiers associated with the first and second PNs 114, 120. In addition, in some embodiments, the UE 102 can cease communication with the network gateway 104 using the network identifier. Similarly, as described in greater detail above, with reference to FIG. 4A, the provisioning device 112 can communicate subscription data to the network gateway 104.

Depending on the embodiment, certain acts, events, blocks, communications or functions identified above can be performed in a different sequence, can be added, merged, or left out altogether (non-limiting example: not all described operations or events are necessary). Moreover, in certain embodiments, operations or events can be performed concurrently, e.g., the provisioning device 112 can set up the first and second VPN tunnels while the UE 102 concurrently communicates with the network gateway 104. In some embodiments, the authentication device 118 can be located within the first PN 114 such that (6) and (7) are omitted, or authentication device 118 can be located on the same network as the provisioning device 112 such that (4), (5), (6), and (7) are omitted. In such embodiments, the provisioning device 112 can communicate with the authentication device 118 using the first PN identifier or the network identifier, respectively. In some cases, the provisioning device 112 can authenticate the UE 102 and obtain the primary network configuration data without communicating with the authentication device 118 (non-limiting example: the primary network configuration data can be located at the provisioning device 112). Furthermore, similar to the activities described above with reference to FIG. 4A, any one or any combination of the activities described above with reference to FIG. 4B can occur automatically and/or without user input.

Figure 5:
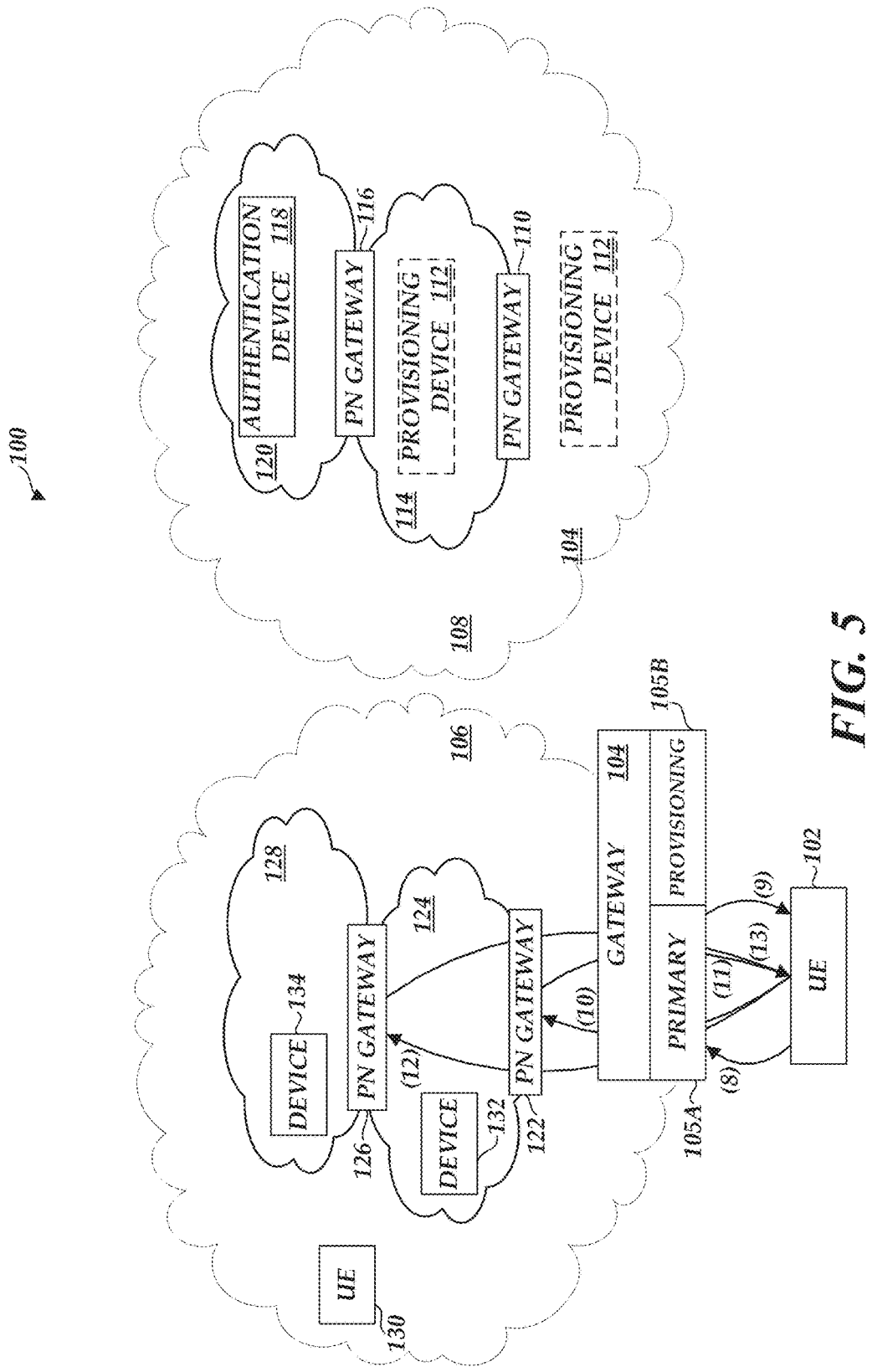
FIG. 5 is a data flow diagram illustrative of an embodiment of communications between various network devices to establish communications with a primary network.

FIG. 5 is a data flow diagram illustrative of an embodiment of communications between various network devices to establish communications with a primary network. In some embodiments, the activities illustrated in FIG. 5 can occur following the activities described above with reference to FIG. 4A or 4B. However, it will be understood that the activities described herein with reference to FIG. 5 can occur whenever a UE 102 has primary network configuration data to enable the UE 102 to communicate with the primary network.

At (8), the UE 102 communicates with the network gateway 104 and requests access to the primary network. In some embodiments, as part of requesting access to the primary network, the UE 102 provides a primary access point identifier, or other identifier, to the network gateway 104. In response to the request from the UE 102, the network gateway 104 can validate the UE 102 for the primary network 106. In certain embodiments, the network gateway 104 can use the subscription data received from the provisioning device 112 to validate the UE 104 for the primary network 106.

In certain instances, such as when the primary network configuration data received from the provisioning device 112 is encrypted, the UE 102 can decrypt the primary network configuration data prior to and/or concurrently with communicating with the network gateway 104.

In addition, as described above, in some instances, the UE 102 can delete or discontinue using the network identifier associated with the provisioning access point and/or the PN identifier, and can terminate the VPN tunnel to the PN 114. In some embodiments, the UE 102 communicates with the network gateway 104 based at least in part on the receipt of the primary network configuration data, and in certain cases, without user interaction with the UE 102. At (9), the UE 102 receives a network identifier for the primary network similar to the receipt of the network identifier for the provisioning network 108 described above.

At (10), the UE 102 establishes a VPN tunnel to the PN 124 that accessible via the PN gateway 122, and (11) receives a PN identifier associated with the PN 124. In some embodiments, using the network identifier for the primary network 106, the UE can communicate with the PN gateway 122 to establish a VPN tunnel to the corresponding PN 124. As part of establishing the VPN tunnel, the UE can provide the PN gateway 122 with one or more credentials (non-limiting examples: identifiers, certifications, username, password, IKE key type, IKE identify, IKE version requirement, split tunnel definition, suite B encryption settings, phase 1 settings, Diffie-Helman groups supported, or other cryptographic keys, CA certificate information, user certificate information, etc.) received as part of the primary network configuration data. The PN gateway 122 can use the data to authenticate and validate the UE for the PN 124. Based at least in part on authenticating the UE for the PN 124, the PN gateway 122 can provide the UE 102 with a PN identifier for the PN 124. Using the identifier, the UE 102 can access one more endpoints within the PN 124, such as the PN gateway 126 or other endpoints (non-limiting examples: UE, devices, servers, networks, etc., within the PN 124).

At (12), using the PN identifier received from the PN gateway 122, the UE 102 establishes a second VPN tunnel with a second PN gateway 126. In some embodiments, the second VPN tunnel is established within the first VPN tunnel. The second VPN tunnel can be established similar to the first VPN tunnel, in that the UE can provide the second PN gateway 126 with at least a portion of the primary network configuration data and the PN gateway 126 can use the received data to validate the UE 102 for the PN 128. Once validated, the PN gateway 122 can (13) communicate a second PN identifier associated with the second PN 128 to the UE 102. Using the second PN identifier, the UE 102 can communicate with one or more endpoints within the second PN. Accordingly, in some embodiments, the UE can maintain at least three network identifiers: a primary network identifier for communications with endpoints within the primary network 106, a first PN identifier for communications with endpoints within the PN 124, and a second PN identifier for communications with endpoints within the PN 128.

By validating the UE on the provisioning network 108 prior to providing the UE with access to the primary network 106 (and PNs 124, 128), the network gateway 104 can increase security for the primary network 106. As mentioned above, in some cases the UE 102 is unaware of the existence of the primary network 106 (non-limiting example: does not include any primary network configuration data to enable access to the primary network 106) and discovers the primary network 106 via the primary network configuration data received from the provisioning device 112. In this way, the network gateway 104 can maintain the primary network 108 secret from UE that are located within the coverage area of the network gateway 104 but lack permissions to access the primary network 106.

Depending on the embodiment, certain acts, events, blocks, communications or functions identified above can be performed in a different sequence, can be added, merged, or left out altogether (non-limiting example: not all described operations or events are necessary). For example, in some cases, any one or any combination of events (10), (11), (12), or (13) can be omitted, such as when the primary network configuration does not include data to access the PNs 124, 128. Moreover, in certain embodiments, operations or events can be performed concurrently. Furthermore, any of the acts or events described above with reference to FIGS. 4A and 4B can be performed in combination with the acts or events described with reference to FIG. 5. Furthermore, similar to the activities described above with reference to FIG. 4A, any one or any combination of the activities described above with reference to FIG. 5 can occur automatically and/or without user input.

Flow Diagrams

Figure 6:
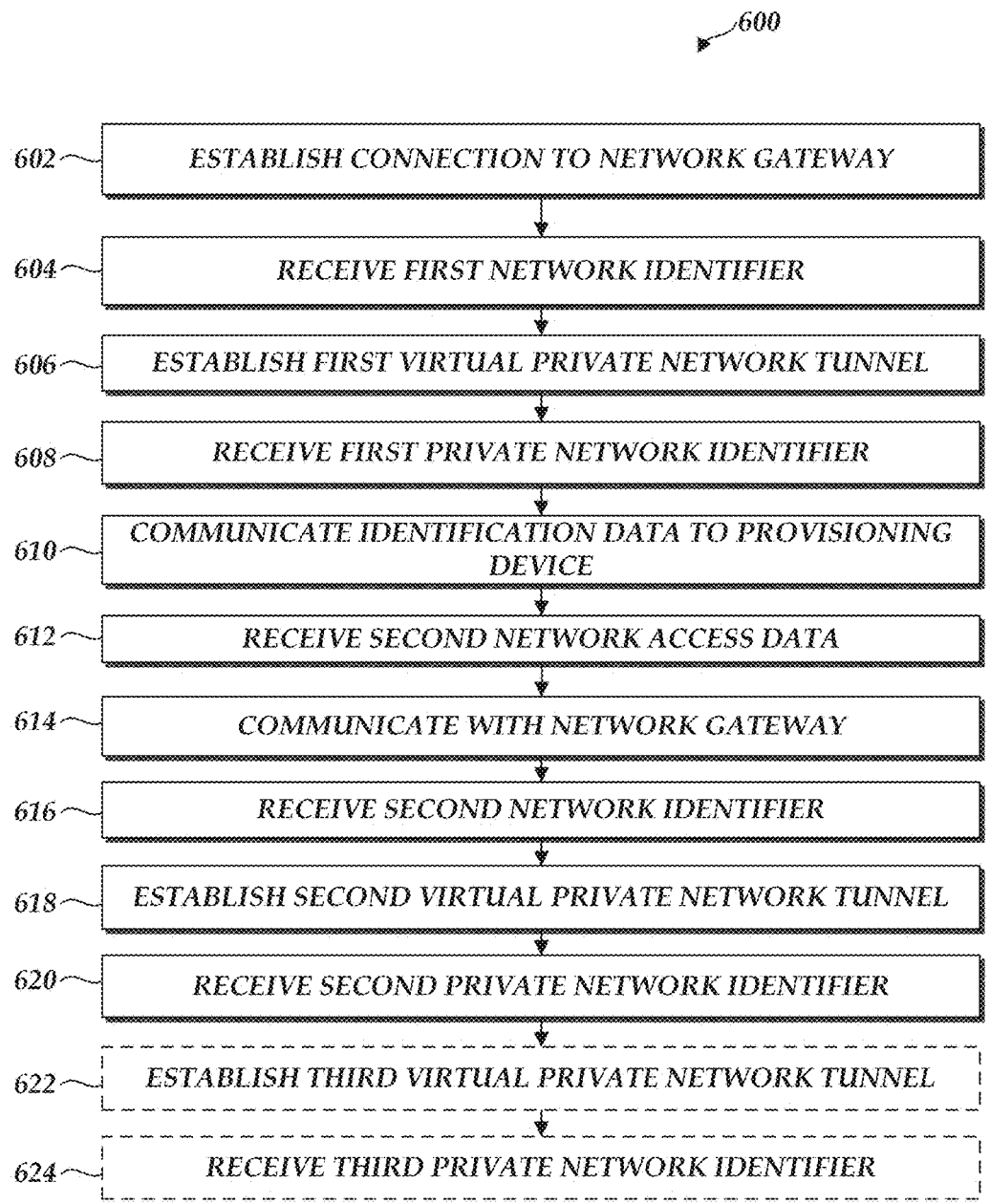
FIG. 6 is a flow diagram illustrative of an embodiment of a routine implemented by a provisioning component for accessing a primary network

FIG. 6 is a flow diagram illustrative of an embodiment of a routine 600 implemented by a provisioning component for accessing a primary network. One skilled in the relevant art will appreciate that the elements outlined for routine 600 may be implemented by one or many computing devices/components that are associated with the provisioning component, such as the UE, an MCN communication system or one of its components, a provisioning device, another computing device, etc. Accordingly, routine 600 has been logically associated as being generally performed by the provisioning component, and thus the following illustrative embodiments should not be construed as limiting.

At block 602, the provisioning component establishes a wireless connection with a network gateway. The wireless connection can be established using any one or any combination of wireless connection technologies, including, but not limited to, cellular technologies (non-limiting examples: LTE, 3GPP, etc.), Wi-Fi, Bluetooth, etc.

At block 604, the provisioning component receives a first network identifier, as described above.

At block 606, the provisioning component establishes a first virtual private network (VPN) tunnel to a first PN. In some embodiments, using the first network identifier, the provisioning component can communicate with a PN gateway to establish a VPN tunnel to the first PN. As described previously, the provisioning component can establish the VPN tunnel by providing the PN gateway with one or credentials, identifiers, certifications, etc. The PN gateway can use the data to authenticate and validate the UE for the PN.

At block 608, the provisioning component receives a first PN identifier. Once the PN gateway authenticates or validates the UE for the PN, the PN gateway can provide the UE with network identifier for the corresponding PN. The first PN identifier can be the same type of identifier as the first network identifier or different. Using the first PN identifier, the provisioning component can access the various endpoints within the PN.

At block 610, the provisioning component communicates identification data, described in greater detail above, to the provisioning device. The provisioning device can be accessible via the PN, and the provisioning component can communicate with the provisioning device using the first PN identifier.

As described above, the provisioning device can use the identification data received from the provisioning component to authenticate the UE for the primary network. In some cases, the provisioning device authenticates the UE itself and/or by communicating the identification data to an authentication device. The authentication device can be located in the first PN or in a different network, such as a different PN. In embodiments in which the authentication device is located in a different network, the provisioning device can use a VPN tunnel to communicate with the authentication device. As described in greater detail above, the VPN tunnel between the provisioning device and authentication device can be established prior to, concurrently with, or after, the provisioning component communicates with the provisioning device.

The provisioning device and/or authentication device, as the case may be, can authenticate the UE using the identification data. For example, the provisioning and/or authentication device can compare the identification data with identification data of UE that are to have access to the primary network and/or verify that the UE has the proper credentials. If there is a match, the provisioning and/or authentication device can authenticate the UE for the primary network. Once authenticated, the provisioning and/or authentication device can generate or obtain primary network configuration data to enable the UE to access the primary network. In some embodiments, the provisioning and/or authentication device can encrypt the primary network configuration data, as described previously. In addition, the provisioning and/or authentication device can generate, obtain, and/or provide the network gateway with subscription data, as described previously.

At block 612, the provisioning component receives the primary network configuration data. As described previously, the provisioning component can receive the primary network configuration data from the provisioning device. In some embodiments, the provisioning component decrypts encrypted primary network configuration data. In addition, as discussed in greater detail above, the provisioning component can perform one or more activities based at least in part on the receipt of the primary network configuration data. For example the provisioning component can terminate the first VPN tunnel, delete, or discontinue the use of, the provisioning network identifier and/or the first PN identifier, etc.

At block 614, the provisioning component communicates with the network gateway to establish access to the primary network. In some embodiments, the provisioning component provides the network gateway with an identifier for the primary network, primary network access point, primary network gateway, and/or other credentials to access the primary network.

At block 616, the provisioning component receives a second network identifier. The second network identifier can be received from the network gateway and correspond to the primary network. Using the second network identifier, the provisioning component can communicate with one or more endpoints accessible via the second network.

At block 618, the provisioning component establishes a second VPN tunnel. In some embodiments, the provisioning component uses the primary network identifier to communicate with a second PN gateway to establish the second VPN tunnel. The provisioning component can establish the second VPN tunnel similar to the manner in which the provisioning component establishes the first VPN tunnel (non-limiting example: communicating digital credentials, digital certifications, etc. to the PN gateway for verification).

At block 620, the provisioning component receives a second PN identifier. The second PN identifier can be received from the second PN gateway via the network gateway and correspond to the second PN. Using the second PN identifier, the provisioning component can communicate with one or more endpoints accessible via the second PN.

Depending on the embodiment, certain acts, events, blocks, or functions of any of the routine 600 can be performed in a different sequence, can be added, merged, or left out altogether (non-limiting example: not all described operations or events are necessary for the practice of the routine 600). For example, in some embodiments, any one or any combination of blocks 606, 608, 618, and 620 can be omitted, such that one or more PNs are not accessed as part of the routine 600. Such embodiments can be implemented when the provisioning device is accessible without establishing a VPN tunnel to a PN or when the primary network configuration data does not include PN configuration data. Moreover, in certain embodiments, operations or events can be performed concurrently, e.g., through multi-threaded processing, interrupt processing, or multiple processors or processor cores or on other parallel architectures, rather than sequentially.

In some embodiments, the routine 600 can further include any one or any combination of blocks 622 and 624. At block 622, the provisioning component establishes a third VPN tunnel. In some embodiments, the provisioning component uses the second PN identifier to communicate with a third PN gateway to establish the third VPN tunnel. The provisioning component can establish the third VPN tunnel similar to the manner in which the provisioning component establishes the first and second VPN tunnels.

At block 624, the provisioning component receives a third PN identifier. The third PN identifier can be received from the third PN gateway via the network gateway and correspond to the third PN. Using the third PN identifier, the provisioning component can communicate with one or more endpoints accessible via the third PN.

Figure 7:
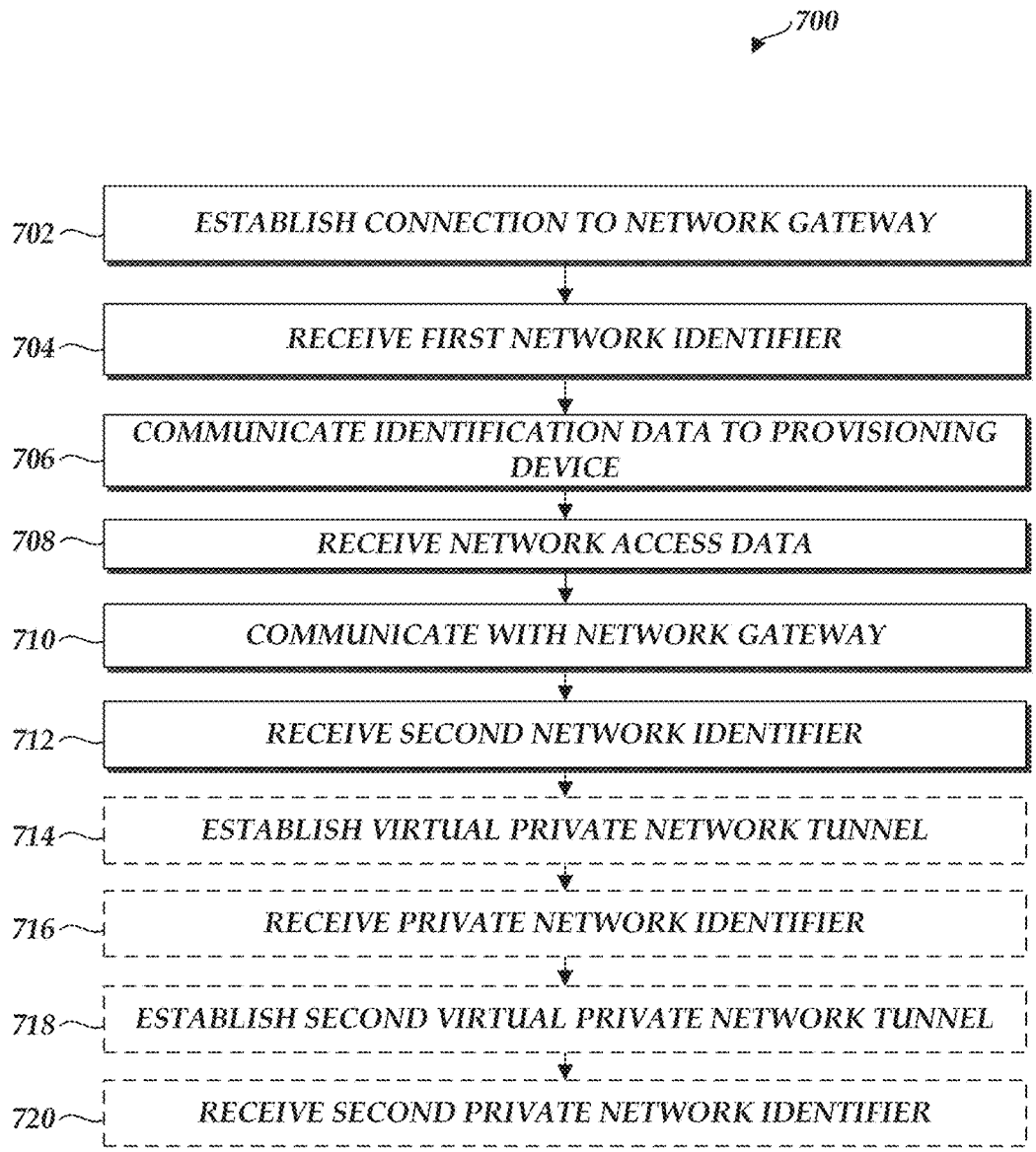
FIG. 7 is a flow diagram illustrative of an embodiment of a routine implemented by a provisioning component for accessing a primary network.

FIG. 7 is a flow diagram illustrative of an embodiment of a routine 700 implemented by a provisioning component for accessing a primary network. One skilled in the relevant art will appreciate that the elements outlined for routine 700 may be implemented by one or many computing devices/components that are associated with the provisioning component, such as the UE, an MCN communication system or one of its components, a provisioning device, another computing device, etc. Accordingly, routine 700 has been logically associated as being generally performed by the provisioning component, and thus the following illustrative embodiments should not be construed as limiting.

At block 702, the provisioning component establishes a connection with a network gateway, and at block 704, the provisioning component receives a first network identifier, similar to what is described above with reference to blocks 602, 604, respectively, of FIG. 6.

At block 706, the provisioning component communicates identification data to the provisioning device, similar to block 610 of FIG. 6. In some embodiments, the provisioning component communicates the identification data to the provisioning device without establishing a VPN tunnel to a PN. For example, the provisioning device can be accessible via the provisioning network without establishing a VPN tunnel.

In certain embodiments, the provisioning device can establish one or more VPN tunnels to one or more PNs similar to the way in which the provisioning component establishes VPN tunnels described previously (non-limiting example: the provisioning device can provide credentials, digital certifications, identification data, etc. to a PN gateway for verification). In some cases, the one or more VPN tunnels can be established prior to communication with the UE or receipt of the identification data. For example, the provisioning device can use the one or more previously existing VPN tunnels to communicate the identification data to one or more endpoints in the PNs.

Using the one or more VPN tunnels (and corresponding PN identifiers), the provisioning device can communicate the identification data to the authentication device as described above. The authentication device can use the identification data to authenticate the UE for the primary network and can communicate primary network configuration data, which can be encrypted, to the provisioning device, as described previously. In some cases, based at least in part on the receipt of the primary network configuration data or communication of the primary network configuration data to the provisioning component, the provisioning device can terminate the one or more tunnels and delete or discontinue the use of the corresponding PN identifiers.

In certain instances, such as when the provisioning device and the authentication device are on the same network (non-limiting example: both accessible in the provisioning network without a VPN tunnel) or implemented on a single device, the provisioning device can communicate with the authentication device without establishing one or more VPN tunnels. In addition, in some cases, the provisioning device receives subscription data for the network gateway as described previously.

Blocks 708, 710, and 712 are similar to blocks 612, 614, 616 described above with reference to FIG. 6. For example, at block 708 the provisioning component receives the primary network configuration data, at block 710 the provisioning component communicates with the network gateway, and at block 712, the provisioning component receives a second network identifier or primary network identifier. As mentioned previously, in some cases, the provisioning component can delete or discontinue using the provisioning network identifier based at least in part on the receipt of the primary network configuration data, the primary network identifier, and/or some other event.

Depending on the embodiment, certain acts, events, blocks, or functions of any of the routine 700 can be performed in a different sequence, can be added, merged, or left out altogether (non-limiting example: not all described operations or events are necessary for the practice of the routine 700). Moreover, in certain embodiments, operations or events can be performed concurrently, e.g., through multi-threaded processing, interrupt processing, or multiple processors or processor cores or on other parallel architectures, rather than sequentially. Furthermore, fewer, more, or different blocks can be used in routine 700 as desired.

For example, the routine 700 can include any one or any combination of blocks 714, 716, 718, and 720. At block 714, the provisioning component establishes a first VPN tunnel and at block 716, the provisioning component receives a first PN identifier, similar to what is described above with reference to blocks 618 and 620 respectively, where the provisioning component establishes a second VPN tunnel and receives a second PN identifier.

At block 718, the provisioning component establishes a second VPN tunnel and at block 716, the provisioning component receives a second PN identifier, similar to what is described above with reference to blocks 622 and 624, respectively, where the provisioning component establishes a third VPN tunnel and receives a third PN identifier.

As discussed previously, the various network (and PN) identifiers can be used to communicate with endpoints on a particular network (or PN). For example, for communications with endpoints within the provisioning network, the provisioning component can use the provisioning network identifier, and for communications with endpoints within the primary network, the provisioning component can use the primary network identifier. Similarly, the provisioning component can use the first, second, or third PN identifiers to communicate with endpoints within first, second, and third PNs, respectively. Thus in some scenarios, the provisioning component can use five or more network identifiers as it communicates with five different networks.

Figure 8:
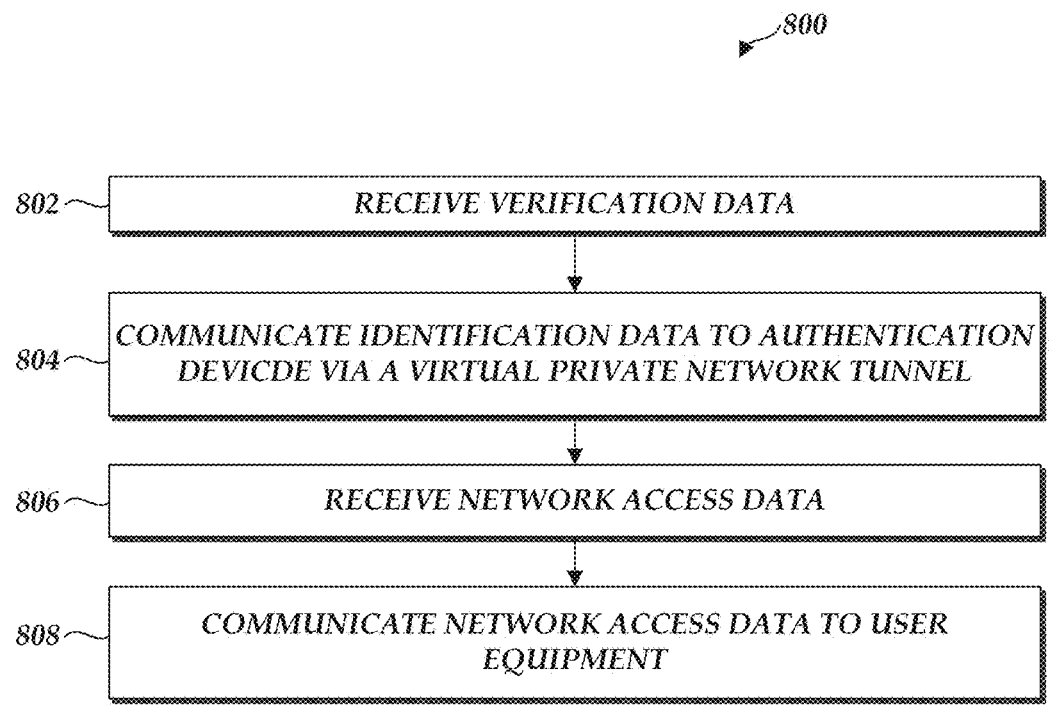
FIG. 8 is a flow diagram illustrative of an embodiment implemented by a provisioning component for providing primary network configuration data.

FIG. 8 is a flow diagram illustrative of an embodiment of a routine 800 implemented by a provisioning component for providing primary network configuration data. One skilled in the relevant art will appreciate that the elements outlined for routine 800 may be implemented by one or many computing devices/components that are associated with the provisioning component, such as the UE, an MCN communication system or one of its components, a provisioning device, another computing device, etc. Accordingly, routine 800 has been logically associated as being generally performed by the provisioning component, and thus the following illustrative embodiments should not be construed as limiting.

At block 802, the provisioning component receives identification data. As described in greater detail above, the provisioning component can receive identification data associated with a UE via a network gateway, and in some cases via one or more PN gateways.

At block 804, the provisioning component communicates at least a portion of the identification data to an authentication device. In some embodiments, the provisioning component can use one or more VPN tunnels and/or one or more PN identifiers to communicate with the authentication device. In some cases, the provisioning component can establish the one or more VPN tunnels based at least in part on receiving the identification data, and in certain cases, the provisioning component can establish the one or more VPN tunnels prior to receiving the identification data.

In certain embodiments, such as when the provisioning component and the authentication device are located within the same network or implemented in the same device, the provisioning component can communicate the identification data to the authentication device without using one or more VPN tunnels.

As discussed in greater detail above, the authentication device can use the identification data to authenticate the UE for a primary network and generate or obtain primary network configuration data to enable the UE to access the primary network and/or one or more PNs accessible via the primary network.

At block 806, the provisioning component receives the primary network configuration data. As described previously, the provisioning component can receive primary network configuration data from the authentication device. In some cases, the primary network configuration data is encrypted by the authentication device such that the provisioning device is unable to access it. In some scenarios, the provisioning device can obtain, generate, or receive subscription data for the network gateway to enable the network gateway to grant the UE access to the primary network.

At block 808, the provisioning component provides the primary network configuration data to the UE. As described in greater detail above, the provisioning component can provide the primary network configuration data to the UE via a network gateway and/or via one or more PN gateways. The UE can use the primary network configuration data to access a primary network and/or one or more PNs via the primary network.

Depending on the embodiment, certain acts, events, blocks, or functions of any of the routine 800 can be performed in a different sequence, can be added, merged, or left out altogether (non-limiting example: not all described operations or events are necessary for the practice of the routine 800). Moreover, in certain embodiments, operations or events can be performed concurrently, e.g., through multi-threaded processing, interrupt processing, or multiple processors or processor cores or on other parallel architectures, rather than sequentially. Furthermore, fewer, more, or different blocks can be used in routine 800 as desired.

Non-Limiting Example Embodiments

Various example embodiments of the disclosure can be described in view of the following clauses:

Clause 1. A method for accessing a second network associated with a mobile cellular network (MCN) communication system, the method comprising:
  requesting a first access point of a MCN communication system based at least in part on a first access point identifier communicated to the MCN communication system;
  receiving a first network identifier associated with the first access point from the MCN communication system;
  establishing a first virtual private network tunnel to a first private network based at least in part on the first network identifier and first private network credentials;
  receiving a first private network identifier associated with the first private network;
  communicating identification data to a provisioning device on the first private network based at least in part on the first private network identifier, wherein the provisioning device communicates the identification data to an authentication device on a distinct private network via a distinct virtual private network tunnel and receives encrypted second network access data from the authentication device;
  receiving from the provisioning device the encrypted second network access data;
  decrypting the encrypted second network access data to obtain a second access point identifier for a second access point of the MCN communication system, second private network credentials for a second private network, and third private network credentials for a third private network;
  terminating the first virtual private network tunnel to the first private network;
  requesting the second access point of the MCN communication system based at least in part on the second access point identifier;
  receiving a second network identifier associated with the second access point from the MCN communication system;
  establishing a second virtual private network tunnel to the second private network based at least in part on the second network identifier and the second private network credentials;
  receiving a second private network identifier associated with the second private network;
  establishing a third virtual private network tunnel to the third private network based at least in part on the second private network identifier and the third private network credentials, wherein the third private network is accessed via the second private network; and
  receiving a third private network identifier associated with the third private network.

Clause 2. A method for enrolling a mobile device with a second network, the method comprising:
  establishing a wireless network connection to a communication system;
  receiving at a user equipment (UE), a first network identifier associated with a first network associated with the communication system;
  communicating identification data to a provisioning device accessible via the first network based at least in part on the first network identifier;
  receiving second network access data from the provisioning device;
  requesting access to a second network associated with the communication system based at least in part on the second network access data;
  receiving a second network identifier associated with the second network from the communication system;
  establishing a virtual private network (VPN) tunnel to a private network based at least in part on the second network identifier; and
  receiving a private network identifier associated with the private network.

Clause 3. The method of Clause 2, wherein the VPN tunnel is a first VPN tunnel, the private network is a first private network, and the private network identifier is a first private network identifier, and wherein said establishing the first VPN tunnel is further based at least in part on first private network credentials received as at least a portion of the second network access data, the method further comprising:
  establishing a second virtual private network tunnel to a second private network based at least in part on the first private network identifier and second private network credentials, the second private network credentials forming at least a portion of the second network access data; and
  receiving a second private network identifier associated with the second private network.

Clause 4. The method of any of Clauses 2 and 3, wherein said establishing the VPN tunnel to the private network is further based at least in part on a network connection application received as at least a portion of the second network access data and executing on the UE.

Clause 5. The method of any of Clauses 2-4, wherein the provisioning device authenticates the UE for the second network based at least in part on the identification data.

Clause 6. The method any of Clauses 2-5, wherein the provisioning device communicates the identification data to an authentication device, wherein the authentication device authenticates the UE for the second network based at least in part on the identification data.

Clause 7. The method of Clause 6, wherein the provisioning device communicates the identification data to the authentication device using one or more VPN tunnels.

Clause 8. The method of any of Clauses 6 and 7, wherein the provisioning device receives the second network access data from the authentication device and communicates the second network access data to the UE.

Clause 9. The method of Clause 8, wherein the second network access data is encrypted.

Clause 10. The method of Clause 9, further comprising decrypting the second network access data, wherein said requesting access to the second network is based at least in part on decrypted second network access data.

Clause 11. The method of any of Clauses 2-10, wherein said requesting access to the second network is based at least in part on an access point identifier received as at least a portion of the second network access data and communicated to the communication system.

Clause 12. The method of any of Clauses 2-11, further comprising communicating with one or more devices in the private network based at least in part on the private network identifier.

Clause 13. The method of any of Clauses 2-12, wherein at least one of the first network identifier, the private network identifier, or the second network identifier comprises an IP address.

Clause 14. The method of any of Clauses 2-13, wherein the communication system comprises a mobile cellular network communication system that independently provides a mobile cellular network to a coverage area in which the UE is located.

Clause 15. The method of any of Clauses 2-14, wherein the VPN tunnel is a second VPN tunnel, the private network is a second private network, and the private network identifier is a second private network identifier, the method further comprising:
  establishing a first VPN tunnel to a first private network based at least in part on the first network identifier and first private network credentials; and
  receiving a first private network identifier associated with the first private network, wherein said communicating identification data to the provisioning device is based at least in part on the first private network identifier.

Clause 16. The method of Clause 15, further comprising terminating the first VPN tunnel based at least in part on at least one of said receiving the second network access data from the provisioning device or said receiving the second network identifier.

Clause 17. The method of any of Clauses 15 and 16, further comprising at least one of deleting the first network identifier or discontinuing the use of the first network identifier based at least in part on at least one of said receiving the second network access data from the provisioning device or said receiving the second network identifier.

Clause 18. The method of any of Clause 15-17, wherein said establishing the first VPN tunnel to the first private network is further based at least in part on a first network connection application executing on the UE.

Clause 19. A wireless mobile communication device, comprising:
  a transceiver configured to send and receive wireless data;
  one or more processors in communication with one or more non-transitory computer-readable media comprising computer-executable instructions that when executed by the one or more processors, cause the one or more processors to:
  establish a network connection to a communication system;
  receive, a provisioning network identifier associated with a provisioning network associated with the communication system;
  communicate identification data to a provisioning device accessible via the provisioning network based at least in part on the provisioning network identifier;
  receive primary network access data from the provisioning device;
  request access to a primary network associated with the communication system based at least in part on the primary network access data; and
  receive a primary network identifier associated with the primary network from the communication system.

Clause 20. The communication device of Clause 19, wherein the communication device is further configured to:
  establish a first virtual private network tunnel to a first private network based at least in part on the provisioning network identifier and first private network credentials,
  receive a first private network identifier associated with the first private network,
  communicate the identification data to the provisioning device based at least in part on the first private network identifier, wherein the provisioning device communicates the identification data to an authentication device via a second virtual private network tunnel between the provisioning device and the authentication device based at least in part on a second private network identifier associated with the provisioning device, and receives the primary network access data from the authentication device, wherein the primary network access data comprises third private network credentials and fourth private network credentials,
  establish a third virtual private network tunnel to a third private network based at least in part on the primary network identifier and the third private network credentials,
  receive a third private network identifier associated with the third private network,
  establish a fourth virtual private network tunnel to a fourth private network based at least in part on the third private network identifier and the fourth private network credentials, and
  receive a fourth private network identifier associated with the fourth private network.

Clause 21. The communication device of any of Clauses 19 and 20, wherein the primary network access data comprises a primary network access point identifier, first private network credentials, second private network credentials, and computer-executable instructions that when executed by the processor cause the processor to:
  communicate the primary network access point identifier to the communication system as part of the request access to the primary network,
  receive the primary network identifier, establish a first virtual private network tunnel to a first private network based at least in part on the primary network identifier and the first private network credentials, receive a first private network identifier associated with the first private network, establish a second virtual private network tunnel to a second private network based at least in part on the first private network identifier and the second private network credentials, and receive a second private network identifier associated with the second private network.

Clause 22. The communication device of any of Clauses 19-21, wherein the provisioning device communicates the identification data to an authentication device via a virtual private network tunnels between the provisioning device and the authentication device, and receives the primary network access data from the authentication device, wherein the primary network access data is encrypted and the communication device is further configured to decrypt the primary network access data before requesting access to the primary network.

Clause 23. A method for enrolling a mobile device with a primary network, the method comprising:
receiving a network connection to a communication system;
receiving at a user equipment (UE), a provisioning network identifier associated with a provisioning network associated with the communication system;
communicating identification data to a provisioning device accessible via the provisioning network based at least in part on the provisioning network identifier;
receiving primary network access data from the provisioning device;
requesting access to a primary network associated with the communication system based at least in part on the primary network access data; and
receiving a primary network identifier associated with the primary network from the communication system.

Clause 24. The method of Clause 23, further comprising:
establishing a first virtual private network tunnel to a first private network based at least in part on the provisioning network identifier and first private network credentials;
receiving a first private network identifier associated with the first private network,
communicating the identification data to the provisioning device based at least in part on the first private network identifier, wherein the provisioning device communicates the identification data to an authentication device via a second virtual private network tunnel between the provisioning device and the authentication device based at least in part on a second private network identifier associated with the provisioning device, and receives the primary network access data from the authentication device, wherein the primary network access data comprises third private network credentials and fourth private network credentials;
establishing a third virtual private network tunnel to a third private network based at least in part on the primary network identifier and the third private network credentials;
receiving a third private network identifier associated with the third private network;

establishing a fourth virtual private network tunnel to a fourth private network based at least in part on the third private network identifier and the fourth private network credentials; and
receiving a fourth private network identifier associated with the fourth private network.

Clause 25. The method of any of Clauses 23 and 24, wherein the primary network access data comprises a primary network access point identifier, first private network credentials, second private network credentials, the method further comprising:
communicating the primary network access point identifier to the communication system as part of the request access to the primary network;
receiving the primary network identifier;
establishing a first virtual private network tunnel to a first private network based at least in part on the primary network identifier and the first private network credentials;
receiving a first private network identifier associated with the first private network;
establishing a second virtual private network tunnel to a second private network based at least in part on the first private network identifier and the second private network credentials; and
receiving a second private network identifier associated with the second private network.

Clause 26. The method of any of Clauses 23-25, wherein the provisioning device communicates the identification data to an authentication device via a virtual private network tunnels between the provisioning device and the authentication device, and receives the primary network access data from the authentication device, wherein the primary network access data is encrypted and the method further comprises decrypting the primary network access data before requesting access to the primary network.

Clause 27. A method for providing primary network access data to a user equipment (UE), the method comprising:
receiving at a provisioning device, identification data from a UE associated with a provisioning network and a first private network based at least in part on a first private network identifier associated with the provisioning device and a first private network identifier associated with the UE;
communicating the identification data to an authentication device on a second private network via a virtual private network tunnel between the provisioning device and the authentication device based at least in part on a second private network identifier associated with the provisioning device and a second private network identifier associated with the authentication device, wherein the authentication device authenticates the UE for a primary network and encrypts primary network access data associated with the primary network based at least in part on the identification data, and wherein the UE lacks credentials to access the second private network and the primary network;
receiving the primary network access data from the authentication device, wherein the primary network access data is encrypted relative to the provisioning device such that the provisioning device in unable to access the primary network access data; and
communicating the primary network access data to the UE, wherein the UE decrypts the primary network access data and accesses the primary network based at least in part on the primary network access data.

Clause 28. A network provisioning device, comprising:
  non-transitory computer-readable medium; and
  one or more processors, the provisioning device configured to:
    receive, identification data from a UE associated with a provisioning network and a first private network based at least in part on a first private network identifier associated with the provisioning device and a first private network identifier associated with the UE;
    communicate the identification data to an authentication device on a second private network via a virtual private network tunnel between the provisioning device and the authentication device based at least in part on a second private network identifier associated with the provisioning device and a second private network identifier associated with the authentication device, wherein the authentication device authenticates the UE for a primary network and encrypts primary network access data associated with the primary network based at least in part on the identification data, and wherein the UE lacks credentials to access the second private network and the primary network;
    receive the primary network access data from the authentication device, wherein the primary network access data is encrypted relative to the provisioning device; and
    communicate the primary network access data to the UE, wherein the UE decrypts the primary network access data and accesses the primary network based at least in part on the primary network access data.

Clause 29. A communication system, comprising:
  a provisioning network gateway configured to provide to a user equipment (UE) access to a provisioning network;
  a provisioning device accessible via the provisioning network, the provisioning device configured to:
    receive identification data from the UE,
    communicate, via at least a first virtual private network tunnel, the identification data to an authentication device accessible via a first private network, wherein the authentication device authenticates the UE for a primary network and encrypts network access data associated with the primary network based at least in part on the identification data, and wherein the UE lacks credentials to access the first private network,
    receive the encrypted network access data from the authentication device, and
    communicate the encrypted network access data to the UE, wherein the UE decrypts the encrypted network access data, and wherein the decrypted network access data comprises primary network access data, second private network credentials associated with a second private network, and third private network credentials associated with a third private network;
  a primary network gateway configured to receive at least a portion of the primary network access data from the UE, and provide the UE with a primary network identifier for access to the primary network;
  a second private network gateway accessible via the primary network and configured to receive the second private network credentials, and establish a second virtual private network tunnel with the UE to the second private network based at least in part on the received second private network credentials; and
  a third private network gateway accessible via the second private network and configured to receive the third private network credentials, and establish a third virtual private network tunnel with the UE to the third private network based at least in part on the received third private network credentials.

Clause 30. A mobile communication device, comprising:
  a transceiver configured to send and receive wireless data;
  one or more processors in communication with one or more non-transitory computer-readable media, the mobile communication device configured to:
    receive at a user equipment (UE), a first network identifier associated with a first network associated with the communication system;
    communicate identification data to a provisioning device accessible via the first network based at least in part on the first network identifier;
    receive second network access data from the provisioning device;
    request access to a second network associated with the communication system based at least in part on the second network access data;
    receive a second network identifier associated with the second network from the communication system;
    establish a virtual private network (VPN) tunnel to a private network based at least in part on the second network identifier; and
    receive a private network identifier associated with the private network.

Clause 31. The mobile communication device of Clause 30, wherein the VPN tunnel is a first VPN tunnel, the private network is a first private network, and the private network identifier is a first private network identifier, and wherein said establishing the first VPN tunnel is further based at least in part on first private network credentials received as at least a portion of the second network access data, wherein the mobile communication device is further configured to:
  establish a second virtual private network tunnel to a second private network based at least in part on the first private network identifier and second private network credentials, the second private network credentials forming at least a portion of the second network access data; and
  receive a second private network identifier associated with the second private network.

Clause 32. The mobile communication device of any of Clauses 30 and 31, wherein the mobile communication device is configured to establish the VPN tunnel to the private network based at least in part on a network connection application received as at least a portion of the second network access data.

Clause 33. The mobile communication device of any of Clauses 30-32, wherein the provisioning device authenticates the UE for the second network based at least in part on the identification data.

Clause 34. The mobile communication device of any of Clauses 30-33, wherein the provisioning device communicates the identification data to an authentication device, wherein the authentication device authenticates the UE for the second network based at least in part on the identification data.

Clause 35. The mobile communication device of Clause 34, wherein the provisioning device communicates the identification data to the authentication device using one or more VPN tunnels.

Clause 36. The mobile communication device of any of Clauses 34 and 35, wherein the provisioning device receives the second network access data from the authentication device and communicates the second network access data to the UE.

Clause 37. The mobile communication device of Clause 36, wherein the second network access data is encrypted.

Clause 38. The mobile communication device of Clause 37, wherein the mobile communication device is further configured to decrypt the second network access data, and wherein the mobile communication device is further configured to request access to the second network based at least in part on decrypted second network access data.

Clause 39. The mobile communication device of any of Clauses 30-38, wherein the mobile communication device is further configured to request access to the second network based at least in part on an access point identifier received as at least a portion of the second network access data.

Clause 40. The mobile communication device of any of Clauses 30-39, wherein the mobile communication device is further configured to communicate with one or more devices in the private network based at least in part on the private network identifier.

Clause 41. The mobile communication device of any of Clauses 30-40, wherein at least one of the first network identifier, the private network identifier, or the second network identifier comprises an IP address.

Clause 42. The mobile communication device of any of Clauses 30-41, wherein the communication system comprises a mobile cellular network communication system that independently provides a mobile cellular network to a coverage area in which the UE is located.

Clause 43. The mobile communication device of any of Clauses 30-42, wherein the VPN tunnel is a second VPN tunnel, the private network is a second private network, and the private network identifier is a second private network identifier, the mobile communication device further configured to:
establish a first VPN tunnel to a first private network based at least in part on the first network identifier and first private network credentials; and
receive a first private network identifier associated with the first private network, wherein said communicating identification data to the provisioning device is based at least in part on the first private network identifier.

Clause 44. The mobile communication device of Clause 43, wherein the mobile communication device is further configured to terminate the first VPN tunnel based at least in part on at least one of said receipt of the second network access data from the provisioning device or receipt of the second network identifier.

Clause 45. The mobile communication device of any of Clauses 43 and 44, wherein the mobile communication device is further configured to at least one of delete the first network identifier or discontinue the use of the first network identifier based at least in part on at least one of receipt of the second network access data from the provisioning device or receipt of the second network identifier.

Clause 46. The mobile communication device of any of Clauses 43 and 45, wherein the mobile communication device is configured to establish the first VPN tunnel to the first private network based at least in part on a first network connection application.

Clause 47. A mobile cellular network (MCN) communication system located within a covered area and configured to generate a MCN for the first covered area and a second MCN for the covered area, the MCN communication system comprising:
a first radio access component configured to receive wireless communications from the one or more user equipment;
a control and data component in communication with the radio access component and configured to process the wireless communications; and
a data store comprising authentication data of the one or more user equipment within the covered area,
wherein the MCN communication system independently provides the first MCN and the second MCN for the covered area, and wherein the MCN communication system is configured to:
receive a request to access the first MCN from a user equipment of the one or more user equipment;
communicate to the user equipment a first MCN network identifier for the first MCN;
receive identification data from the user equipment based at least in part on the first MCN network identifier;
communicate the identification data to a provisioning device, wherein the wherein the provisioning device communicates the identification data to an authentication device via a virtual private network tunnels between the provisioning device and the authentication device, receives primary network access data from the authentication device;
receive the primary network access data from the from the provisioning device; and
communicate the primary network access data to the user equipment,
receive a request to access the second MCN from the user equipment based at least in part on the primary network access data, and
communicate to the user equipment a second MCN network identifier for the second MCN.

Terminology

Although generally described above as being related to MCN communication systems, it will be understood that the backhaul access component can be implemented as a standalone device and can communicate with an MCN communication system and/or a component of a network to control access to the backhaul. For example, the backhaul access component can be configured to communicate with a base station or a core component of a cellular network, such as, but not limited to, a component of the evolved packet core (EPC) of a long-term evolution (LTE) system, etc., or other type of wireless network. In such embodiments, the backhaul access component can cause the corresponding component to perform some or all of the functions described herein with respect to the MCN communication system.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Depending on the embodiment, certain operations, acts, events, or functions of any of the algorithms described herein can be performed in a different sequence, can be added, merged, or left out altogether (non-limiting example: not all are necessary for the practice of the algorithms). Moreover, in certain embodiments, operations, acts, functions, or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems and/or computing devices.

Virtualization technologies allow a single physical computing device to host one or more instances of a virtual machine, which virtual machine instance appears to a user as an independent computing device. With virtualization, the host computing device can create, maintain, delete, or otherwise manage virtual machines instances in a dynamic manner. In turn, users can request computing resources, including single computing devices or a configuration of networked computing devices, and be provided with virtual machine instances that provide the requested computing resources.

An instance of a virtual machine may be configured to provide specific functionality. For example, a virtual machine instance may be associated with different combinations of software applications and operating systems or operating system configurations to enable a virtual machine to provide different desired functionalities, or to provide similar functionalities more efficiently.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention may be recited as a means-plus-function claim under 35 U.S.C. sec. 112(f) (AIA), other aspects may likewise be embodied as a means-plus-function claim, or in other forms, such as being embodied in a computer-readable medium. Any claims intended to be treated under 35 U.S.C. §112(f) will begin with the words "means for", but use of the term "for" in any other context is not intended to invoke treatment under 35 U.S.C. §112(f). Accordingly, the applicant reserves the right to pursue additional claims after filing this application, in either this application or in a continuing application.

Disjunctive language such as the phrase "at least one of X, Y, or Z," unless specifically stated otherwise, is otherwise understood with the context as used in general to present that an item, term, etc., may be either X, Y, or Z, or any combination thereof (non-limiting examples: X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A method for enrolling a mobile device with a second network, the method comprising:
   establishing a wireless network connection to a communication system;
   receiving at a user equipment (UE), a first network identifier associated with a first network associated with the communication system;
   communicating identification data to a provisioning device accessible via the first network based at least in part on the first network identifier;
   receiving second network access data from the provisioning device, the second network access data including a first private network credential and a second private network credential;
   requesting access to a second network associated with the communication system based at least in part on the second network access data;
   receiving a second network identifier associated with the second network from the communication system;
   establishing a first virtual private network (VPN) tunnel to a first private network based at least in part on the second network identifier and the first private network credential;
   receiving a first private network identifier associated with the first private network;
   establishing a second VPN tunnel to a second private network based at least in part on the first private network identifier and the second private network credential; and
   receiving a second private network identifier associated with the second private network.

2. The method of claim 1, wherein said establishing the first VPN tunnel to the first private network is further based at least in part on a network connection application received as at least a portion of the second network access data and executing on the UE.

3. The method of claim 1, wherein the provisioning device communicates the identification data to an authentication device, wherein the authentication device authenticates the UE for the second network based at least in part on the identification data.

4. The method of claim 3, wherein the provisioning device communicates the identification data to the authentication device using one or more VPN tunnels.

5. The method of claim 3, wherein the provisioning device receives the second network access data from the authentication device and communicates the second network access data to the UE.

6. The method of claim 5, wherein the second network access data is encrypted.

7. The method of claim 6, further comprising decrypting the second network access data, wherein said requesting access to the second network is based at least in part on decrypted second network access data.

8. The method of claim 1, wherein said requesting access to the second network is based at least in part on an access point identifier received as at least a portion of the second network access data and communicated to the communication system.

9. The method of claim 1, wherein at least one of the first network identifier, the first private network identifier, the second network identifier, or the second private network identifier comprises an IP address.

10. The method of claim 1, wherein the communication system comprises a mobile cellular network communication system that independently provides a mobile cellular network to a coverage area in which the UE is located.

11. A method for enrolling a mobile device with a second network, the method comprising:
establishing a wireless network connection to a communication system;
receiving at a user equipment (UE), a first network identifier associated with a first network associated with the communication system;
establishing a first virtual private network (VPN) tunnel to a first private network based at least in part on the first network identifier and first private network credentials;
receiving a first private network identifier associated with the first private network;
communicating identification data to a provisioning device accessible via the first network based at least in part on the first network identifier and the first private network identifier;
receiving second network access data from the provisioning device;
requesting access to a second network associated with the communication system based at least in part on the second network access data;
receiving a second network identifier associated with the second network from the communication system;
deleting or discontinuing the use of the first network identifier based at least in part on at least one of said receiving the second network access data from the provisioning device or said receiving the second network identifier;
establishing a second VPN tunnel to a second private network based at least in part on the second network identifier; and
receiving a second private network identifier associated with the second private network.

12. The method of claim 11, further comprising:
establishing a third VPN tunnel to a third private network based at least in part on the second private network identifier and third private network credentials, the third private network credentials forming at least a portion of the second network access data; and
receiving a third private network identifier associated with the third private network.

13. The method of claim 11, wherein the provisioning device communicates the identification data to an authentication device, wherein the authentication device authenticates the UE for the second network based at least in part on the identification data.

14. The method of claim 13, wherein the provisioning device communicates the identification data to the authentication device using one or more VPN tunnels.

15. The method of claim 13, wherein the provisioning device receives the second network access data from the authentication device and communicates the second network access data to the UE.

16. The method of claim 11, wherein the communication system comprises a mobile cellular network communication system that independently provides a mobile cellular network to a coverage area in which the UE is located.

17. A system for enrolling a mobile device with a second network, the system comprising one or more processors configured to:
establish a wireless network connection to a communication system;
receive at a user equipment (UE), a first network identifier associated with a first network associated with the communication system;
communicate identification data to a provisioning device accessible via the first network based at least in part on the first network identifier;
receive second network access data from the provisioning device, the second network access data including a first private network credential and a second private network credential;
request access to a second network associated with the communication system based at least in part on the second network access data;
receive a second network identifier associated with the second network from the communication system;
establish a first virtual private network (VPN) tunnel to a first private network based at least in part on the second network identifier and the first private network credential;
receive a first private network identifier associated with the private network;
establish a second VPN tunnel to a second private network based at least in part on the first private network identifier and the second private network credential; and
receive a second private network identifier associated with the second private network.

18. The system of claim 17, wherein the provisioning device communicates the identification data to an authentication device, wherein the authentication device authenticates the UE for the second network based at least in part on the identification data.

19. The system of claim 18, wherein the provisioning device communicates the identification data to the authentication device using one or more VPN tunnels.

20. The system of claim 18, wherein the provisioning device receives the second network access data from the authentication device and communicates the second network access data to the UE.

21. The system of claim 20, wherein the second network access data is encrypted.

22. The system of claim 17, wherein the system comprises a mobile cellular network communication system that independently provides a mobile cellular network to a coverage area in which the UE is located.

23. A system for enrolling a mobile device with a second network, the system comprising one or more processors configured to:
establish a wireless network connection to a communication system;
receive at a user equipment (UE), a first network identifier associated with a first network associated with the communication system;
establish a first virtual private network (VPN) tunnel to a first private network based at least in part on the first network identifier and first private network credentials;
receive a first private network identifier associated with the first private network;

communicate identification data to a provisioning device accessible via the first network based at least in part on the first network identifier and the first private network identifier;

receive second network access data from the provisioning device;

request access to a second network associated with the communication system based at least in part on the second network access data;

receive a second network identifier associated with the second network from the communication system;

delete or discontinue the use of the first network identifier based at least in part on at least one of receipt of the second network access data from the provisioning device or receipt of the second network identifier;

establish a second VPN tunnel to a second private network based at least in part on the second network identifier; and receive a second private network identifier associated with the private network.

24. The system of claim 23, wherein the one or more processors are further configured to:

establish a third VPN tunnel to a third private network based at least in part on the second private network identifier and third private network credentials, the third private network credentials forming at least a portion of the second network access data; and receive a third private network identifier associated with the third private network.

25. The system of claim 23, wherein the provisioning device communicates the identification data to an authentication device, wherein the authentication device authenticates the UE for the second network based at least in part on the identification data.

26. The system of claim 25, wherein the provisioning device communicates the identification data to the authentication device using one or more VPN tunnels.

27. The system of claim 23, wherein the system comprises a mobile cellular network communication system that independently provides a mobile cellular network to a coverage area in which the UE is located.

* * * * *